US009941725B2

(12) United States Patent
Lee

(10) Patent No.: US 9,941,725 B2
(45) Date of Patent: Apr. 10, 2018

(54) METHOD AND ELECTRONIC DEVICE FOR SUPPLYING POWER TO BATTERY

(71) Applicant: Samsung Electronics Co., Ltd., Suwon-si, Gyeonggi-do (KR)

(72) Inventor: Kwang-Yoon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/016,709

(22) Filed: Feb. 5, 2016

(65) Prior Publication Data

US 2017/0222450 A1  Aug. 3, 2017

(30) Foreign Application Priority Data

Feb. 3, 2016 (KR) ........................ 10-2016-0013673

(51) Int. Cl.
  *H02J 7/04* (2006.01)
  *H02J 7/16* (2006.01)
  *H02J 7/00* (2006.01)

(52) U.S. Cl.
  CPC ............ *H02J 7/007* (2013.01); *H02J 7/0052* (2013.01)

(58) Field of Classification Search
  CPC .......... Y02E 60/12; H02J 7/14; H02J 7/0068; H01M 10/441; H01M 10/44
  USPC ....................................................... 320/162
  See application file for complete search history.

(56) References Cited

U.S. PATENT DOCUMENTS

| 2003/0006735 | A1* | 1/2003 | Kawakami | G01R 31/361 320/133 |
| 2006/0017444 | A1* | 1/2006 | Fechalos | G01R 31/3668 324/433 |
| 2009/0128097 | A1* | 5/2009 | Esnard | G01R 31/3679 320/137 |
| 2014/0266044 | A1 | 9/2014 | Kang et al. | |

FOREIGN PATENT DOCUMENTS

KR  10-2014-0114151 A  9/2014

OTHER PUBLICATIONS

Lee et al.; A Switching-based Fast Li-Ion Battery Charger by Continuously Compensating Built-In Resistance for Mobile Devices; The 22nd Korean Conference on Semiconductors (KCS 2015); WP2-57; 2015; Korea.

* cited by examiner

Primary Examiner — Arun Williams
(74) Attorney, Agent, or Firm — Jefferson IP Law, LLP

(57) ABSTRACT

A method and an electronic device for supplying power to a battery are provided. The electronic device includes a housing, a battery disposed inside the housing, and a power management circuit configured to control power supplied from an external power source to the battery. The power management circuit is configured to supply power from the external power source to the battery to apply a substantially constant current to the battery during a first time interval, supply power from the external power source to the battery to maintain a substantially constant voltage in the battery during a second time interval following the first time interval, sense a current value applied to the battery and a voltage value of the battery, and determine a duration of the first time interval based on at least part of the sensed current value and the sensed voltage value.

19 Claims, 10 Drawing Sheets

METHOD AND ELECTRONIC DEVICE FOR SUPPLYING POWER TO BATTERY

CROSS-REFERENCE TO RELATED APPLICATION(S)

This application claims the benefit under 35 U.S.C. § 119(a) of a Korean patent application filed on Feb. 3, 2016 in the Korean Intellectual Property Office and assigned Serial number 10-2016-0013673, the entire disclosure of which is hereby incorporated by reference.

TECHNICAL FIELD

The present disclosure relates to a method and apparatus for supplying power to a battery.

BACKGROUND

As more and more functions are available in a portable device, the demand for a long use time of the portable device is increasing. Particularly, the battery capacity of the portable device is on the increase in order to lengthen the use time of the portable device. The increase of the battery capacity in turn increases a time to charge a battery. Accordingly, there is a need for a high-efficiency charging technique to reduce a battery charging time.

In general, a charging current supplied to the battery is increased to reduce the charging time of the battery. However, this scheme has limitations in increasing a charging current due to the decrease of a battery lifetime and heat emission. Accordingly, there is a need for a method for effectively reducing the charging time of a battery with high efficiency, other than the method for charging a battery by increasing a charging current.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and electronic device for reducing the charging time of a battery.

In accordance with an aspect of the present disclosure, an electronic device is provided. The electronic device includes a housing, a battery disposed inside the housing, and a power management circuit configured to control power supplied from an external power source to the battery. The power management circuit is configured to supply power from the external power source to the battery to apply a substantially constant current (CC) to the battery during a first time interval, supply power from the external power source to the battery to maintain a substantially constant voltage (CV) in the battery during a second time interval following the first time interval, sense a current value applied to the battery and a voltage value of the battery, and determine a duration of the first time interval based on at least part of the sensed current value and the sensed voltage value.

In accordance with another aspect of the present disclosure, a method for operating an electronic device that is connected electrically to each of a battery and an external power source and supplying power to the battery is provided. The method includes supplying power from an external power source to the battery apply a substantially CC to the battery during a first time interval, supplying power from the external power source to the battery to maintain a substantially CV in the battery during a second time interval, sensing a current value applied to the battery and a voltage value of the battery, and determining a duration of the first time interval based on at least part of the sensed current value and the sensed voltage value.

In accordance with another aspect of the present disclosure, a storage medium is provided. The storage medium includes storing commands for, when the commands are executed by at least one processor, controlling the at least one processor to perform at least one operation is provided. The at least one operation includes supplying power from an external power source to a battery apply a substantially CC to the battery during a first time interval, supplying power from the external power source to the battery to maintain a substantially CV in the battery during a second time interval, sensing a current value applied to the battery and a voltage value of the battery, and determining a duration of the first time interval based on at least part of the sensed current value and the sensed voltage value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
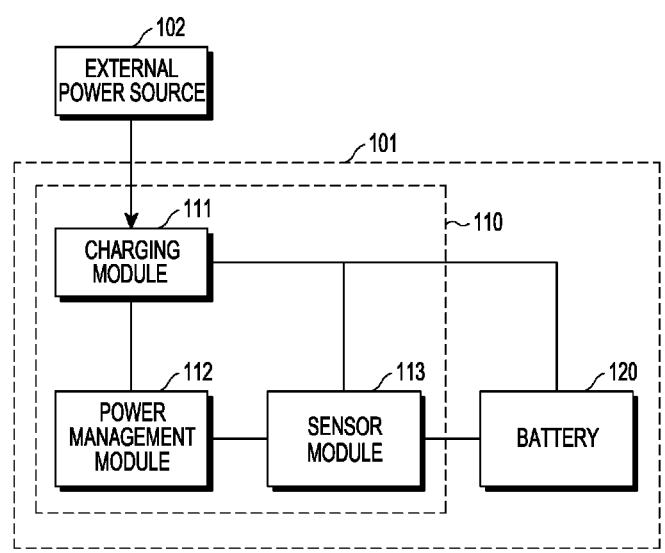
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the term 'have', 'may have', 'include', or 'may include' signifies the presence of a specific feature (for example, number, function, operation, or part), not excluding the presence or addition of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions may be used to distinguish one component from another component. For example, a first user equipment (UE) and a second UE may indicate different UEs irrespective of sequence or importance. For example, a first component may be referred to as a second component and vice versa without departing from the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations.

Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may be at least one of, for example, a smart phone, a tablet personal computer (PC), a mobile phone, a video phone, an e-book reader, a desktop PC, a laptop PC, a Netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical equipment, a camera, and a wearable device. According to various embodiments, the wearable device may be at least one of an accessory type (for example, a watch, a ring, a bracelet, an ankle bracelet, a necklace, glasses, contact lenses, or a head-mounted device (HMD)), a cloth or clothes-integrated type (for example, electronic clothes), a body-attached type (for example, a skin pad or a tattoo), and an implantable type (for example, an implantable circuit).

According to various embodiments, an electronic device may be a home appliance. For example, the home appliance may be at least one of, for example, a television (TV), a digital versatile disc (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, and an electronic picture frame.

According to various embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler), and the like.

According to various embodiments, an electronic device may be at least one of furniture, part of a building/structure, an electronic board, an electronic signature receiving device, a projector, and various measuring devices (for example, water, electricity, gas or electro-magnetic wave measuring devices). According to various embodiments, an electronic device may be one or a combination of two or more of the foregoing devices. According to various embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

With reference to the attached drawings, an electronic device according to various embodiments will be described below. In the present disclosure, the term 'user' may refer to a person or device (for example, artificial intelligence electronic device) that uses an electronic device.

FIG. 1 is a block diagram of an electronic device according to various embodiments of the present disclosure.

Referring to FIG. 1, an electronic device 101 may include a power management circuit 110 and a battery 120. The power management circuit 110 may supply power to the battery 120. The power management circuit 110 may include at least one of a charging module 111, a power management module 112, and a sensor module 113. An external power source 102 may be connected to the electronic device 101 to supply power to the electronic device 101 via a wired or a wireless charging scheme. According to an embodiment of the present disclosure, the electronic device 101 may be configured not to include the battery 120.

The power management circuit 110 may control an operation of the electronic device 101, for example, an operation of the electronic device 101 for supplying power to the battery 120. According to an embodiment of the present disclosure, a time period during which the battery 120 is charged may be divided into a first time interval and a second time interval. The power management circuit 110 may adjust the duration of the first time interval or the second time interval. The power management circuit 110 may control power supply from the external power source 102 to the battery 120 so that a substantially constant current (CC) may be applied to the battery 120 during the first time interval. Also, the power management circuit 110 may control power supply from the external power source 102 to the battery 120 so that the battery 120 may maintain a substantially constant voltage (CV) during the second time interval.

The charging module 111 may charge the battery 120 by receiving power from the external power source 102 and supplying the received power to the battery 120. According to an embodiment of the present disclosure, the charging module 111 may convert power received from the external power source 102 to power that can be supplied to the battery 120.

According to an embodiment of the present disclosure, the battery 120 may include a cell and an internal resistor. The internal resistor may be a resistor component generated during implementation of the battery 120. Power supplied from the external power source 102 through the charging module 111, for example, an alternating current (AC) current included in the power may be applied to the internal resistor and thus an AC voltage may also be applied to the internal resistor of the battery 120.

According to an embodiment of the present disclosure, the power management module 112 may control a charging operation for charging the battery 120. For example, the power management module 112 may control a charging time of the battery 120 according to a current or voltage value applied to the battery 120. As described before, the charging time of the battery may be divided into the first time interval and the second time interval. The power management module 112 may adjust the duration of the first time interval or the second time interval. The power management module 112 may control power supply from the external source 102 to the battery 120 so that a substantially CC may be applied to the cell or internal resistor of the battery 120 during the first time interval. The power management module 112 may also control power supply from the external source 102 to the battery 120 so that the battery 120 may maintain a substantially CV during the second time interval. In addition, the power management module 112 may control power supply to the battery 120 by controlling the charging module 111 or the sensor module 113.

According to an embodiment of the present disclosure, if a voltage value of the battery 120 (for example, the sum of a voltage value of the cell of the battery 120 and a voltage value of the internal resistor of the battery 120) reaches a predetermined first reference value by applying a substantially CC to the battery 120, the power management module 112 may end the first time interval. As described above, the first time interval may span from a starting time of power supply to the battery 120 to a time when the voltage value of the battery 120 becomes the first reference value. According to an embodiment of the present disclosure, the first reference value may be a value pre-stored in the electronic device 101, a value input by a user, or any value determined by the power management module 112. Further, the first reference value may vary according to the state of the external power source 102 or the state of the battery 120 (for example, a use number, a charging number, a use environment, and the like) and may be calculated dynamically. The first reference value may vary according to a charging scheme for the battery 120, for example, depending on whether the battery 120 is wireless charged or fast charged.

According to an embodiment of the present disclosure, the power management module 112 may control the sensor module 113 to measure a current value or a voltage value applied to the battery 120 during the first time interval. The power management module 112 may calculate a ratio between a current variation and a voltage variation of the battery 120 using current values or voltage values received (in real time) from the sensor module 113. The power management module 112 may calculate an AC current value or an AC voltage value applied to the internal resistor of the battery 120 using the ratio between the current variation and the voltage variation. Further, the power management module 112 may calculate an internal resistance value of the battery 120 using the AC current value or the AC voltage value applied to the internal resistor.

According to an embodiment of the present disclosure, the power management module 112 may determine (or calculate) an internal resistance value of the battery 120. A current supplied to the battery 120 by the external power source 102 may include a direct current (DC) current and an AC current. Also, the battery 120 may include an internal resistor. As the AC current is applied to the internal resistor of the battery 120, an AC voltage may be additionally applied to the designed capacity of the battery 120. For example, if the battery 120 is designed to have a capacity of 4.2V, an internal resistance of 0.2Ω is added in a design process, and a current of 2 A is supplied to the battery 120, a maximum voltage that may be actually applied to the battery 120 may be 4.6V by adding a voltage of the internal resistor, 0.4V to the capacity of the battery, 4.2V.

According to an embodiment of the present disclosure, once the internal resistance value is determined, the power management module 112 may determine the first reference value. The first reference value may be the sum of a value close to the maximum voltage value based on the capacity of the cell of the battery 120 and a voltage value applied to the internal resistor. For example, if the designed capacity of the cell of the battery 120 is 4.2V, a CC of 2 A is supplied, and the internal resistance value is 0.3Ω, a voltage of 0.6V may be applied to the internal resistor. For example, the power management module 112 may determine the first reference value to be a random value between 4.62V and 4.78V closed to the sum of the capacity of the cell of the battery 120 and the voltage value applied to the internal resistor. Since the first time interval spans from a starting time of charging to a time when the voltage value of the battery 120, that is, the sum of the voltage value of the cell of the battery 120 and the voltage value of the internal resistor reaches the first reference value, the power management module 112 may control the duration of the first time interval by determining the first reference value based on at least part of the internal resistance value of the battery 120.

If the first time interval ends, the second time interval may start. After the first time interval, the power management module 112 may control the charging module 111 to supply power the external power source 102 to the battery 120 so that the voltage value of the battery 120 may be maintained substantially constant. The second time interval may span from the ending time of the first time interval to a time when the current value of the battery 120 is a predetermined second reference value.

According to an embodiment of the present disclosure, the power management module 112 may control the charging module 111 to (fast) reduce the amount of a current supplied from the external power source 102 to the battery 120 until the current value applied to the battery 120 becomes the second reference value during the second time interval. Also, the voltage value of the battery 120 may be maintained (almost) constant during the second time interval. The power management module 112 may maintain the voltage value of the cell of the battery 120 (almost) constant by maintaining the voltage value of the battery 120 (almost) constant. Since the current value of the battery 120 is fast decreased until it becomes the second reference value, while the voltage value of the battery 120 is maintained (almost) constant during the second time interval, an AC component generated in the internal resistor of the battery 120 may be eliminated (mostly). Further, the power management module 112 may charge only the cell of the battery 120 fully in view of elimination of (almost all of) the AC component generated in the internal resistor of the battery 120.

According to an embodiment of the present disclosure, the second reference value may be an arbitrary current value set by the power management module 112, which may be close to 0. For example, the power management module 112 may set 0.001 A as the second reference value. The voltage value of the battery 120 maintained (almost) constant during the second time interval may be close (or equal) to the first reference value. The power management module 112 may control the charging module 111 to reduce the amount of a current applied to the battery 120, while maintaining the voltage value of the battery 120 close to the first reference value. If the amount of the current applied to the battery 120 is reduced, while the voltage value of the battery 120 is maintained close (or equal) to the first reference value, the AC current applied to the internal resistor of the battery 120 also becomes close to 0. Therefore, the internal resistance component is (substantially) eliminated and only the cell of the battery 120 may be charged. According to an embodiment of the present disclosure, the second reference value may vary according to the state of the external power source 102 or the state of the battery 120 (for example, a use number, a charging number, a use environment, and the like) and may be calculated dynamically. The second reference value may vary according to a charging scheme for the battery 120, for example, depending on whether the battery 120 is wireless charged or fast charged.

As described above, if a current value applied to the battery 120 at the ending time of the first time interval is larger than the second reference value, the power management module 112 may reduce the amount of the current applied to the battery 120 as fast as possible by controlling the charging module 111 so that the current value applied to the battery 120 becomes the second reference value. For example, if the first reference value is larger than the maximum voltage value of the cell of the battery 120, the internal resistance component of the battery 120 may disappear and the voltage of the battery 120 may become smaller than the first reference value during the second time interval. Further, since power is continuously supplied to the cell of the battery 120 even during the second time interval, the cell of the battery 120 may be charged fully. The power management module 112 may determine a time when the current value applied to the battery 120 becomes the second reference value to be a time when the cell of the battery 120 is fully charged.

As described above, the power management module 112 may determine the internal resistance value of the battery 120 and determine the first reference value using the internal resistance value. Once the first reference value is determined, the duration of the first time interval may be determined. Also, since the second time interval ends at the time of fully charging the battery 120, the power management module 112 may control a total charging time of the battery 120 and the duration of the second time interval at the same time by (fast) reducing the amount of a current supplied to the battery 120.

According to an embodiment of the present disclosure, the charging time of the battery 120 may include only the first time interval. If the voltage value of the battery 120 measured by the sensor module 113 is the sum of the maximum voltage value applicable to the cell of the battery 120 and the voltage value of the internal resistor of the battery 120, the power management module 112 may determine that the battery 120 has been charged fully. That is, the battery 120 may be charged fully during the first time interval. If the battery 120 is fully charged during the first time interval in this manner, the power management module 112 may skip the second time interval during which an operation for reducing the current applied to the battery 120 to the second reference value is performed.

The sensor module 113 may measure a current value or voltage value applied to the battery 120, or measure a current value or voltage value output from the charging module 111. The sensor module 113 may provide the measured current value or voltage value to the power management module 112. Further, the sensor module 113 may be configured to include a voltage measurement sensor or a current measurement sensor.

The battery 120 may be electrically connected to the electronic device 101 and receive power from the external power source through the charging module 111.

According to an embodiment of the present disclosure, the electronic device 101 may be configured to include the battery 120. Also, the electronic device 101 may be configured to be surrounded by a housing. According to an embodiment of the present disclosure, the electronic device 101 may be configured to include an AP so that the AP may control charging of the battery 120. The AP may be configured to include the power management circuit 110 illustrated in FIG. 1 and thus may control power supply to the battery 120.

According to an embodiment of the present disclosure, an electronic device may include a housing, a battery disposed inside the housing, and a power management circuit configured to control power supplied from an external power source to the battery. The power management circuit may be configured to supply power from the external power source to the battery so that a substantially CC may be applied to the battery during a first time interval, supply power from the external power source to the battery so that a substantially CV may be maintained in the battery during a second time interval following the first time interval, sense a current value applied to the battery and a voltage value of the battery, and determine a duration of the first time interval based on at least part of the sensed current value and the sensed voltage value.

According to an embodiment of the present disclosure, the power management circuit may be configured to include a sensor module for sensing a current value applied to the battery or a voltage value of the battery.

According to an embodiment of the present disclosure, the power management circuit may be configured to determine an internal resistance value of the battery based on the at least part of the sensed current value and the sensed voltage value, and change the duration of the first time interval based on at least part of the internal resistance value. During the first time interval, the power management circuit may determine an AC current value or an AC voltage value applied to an internal resistor of the battery based on at least part of a ratio between a variation in the sensed current value and a variation in the sensed voltage value, and determine the internal resistance value of the battery based on at least part of the AC current value or the AC voltage value. The power management circuit may determine a first reference value to which the voltage value of the battery is to reach during the first time interval, based on at least part of the internal resistance value of the battery. The power management circuit may control power supply to the battery to apply a CC to the battery until the voltage value of the battery reaches the first reference value.

According to an embodiment of the present disclosure, the power management circuit may maintain, as the first reference value, a value calculated by subtracting a voltage value applied to the internal resistor of the battery from the voltage value of the battery during the second time interval, and, if a current value applied to the battery is equal to or smaller than a predetermined second reference value, may determine termination of the second time interval. If the voltage value of the battery becomes the first reference value during the first time interval, the power management circuit may check a current value applied to the battery, and control power supply to the battery to make the checked current value equal to the predetermined second reference value.

According to an embodiment of the present disclosure, if the voltage value of the battery reaches a maximum voltage value applicable to the battery, the power management circuit may determine termination of both of the first time interval and the second time interval.

Figure 2:
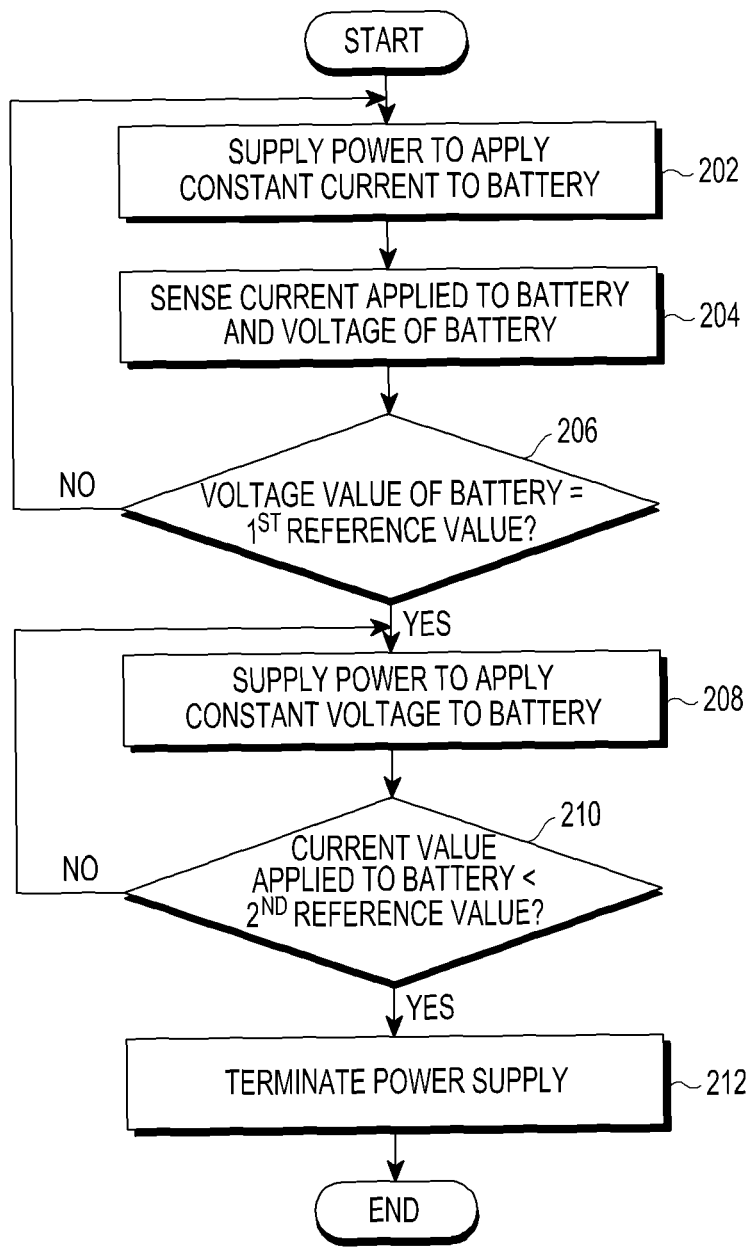
FIG. 2 is a flow chart of a method for charging a battery according to various embodiments of the present disclosure.

FIG. 2 is a flowchart of a method for charging a battery according to various embodiments of the present disclosure.

Referring to FIG. 2, the power management module 112 of the power management circuit 110 in the electronic device 101 may supply power from the external power source 102 to the battery 120 so that a CC may be applied to the battery 120 by the external power source 102 in operation 202. In operation 204, the sensor module 113 of the power management circuit 110 may sense a current value or a voltage value applied to the battery 120. According to an embodiment of the present disclosure, operations 202 and 204 may be performed substantially simultaneously. For example, the power management module 112 of the power management circuit 110 in the electronic device 101 may control the sensor module 113 to measure a voltage value or current value applied to the battery 120 every predetermined time (for example, every 5 ms), simultaneously with supplying power to the battery 120 through the charging module 111.

According to an embodiment of the present disclosure, the power management module 112 of the power management circuit 110 may determine (or calculate) an internal resistance value of the battery 120 using the current value or voltage value of the battery 120 sensed in operation 204, and determine a first reference value based on at least part of the internal resistance value. The first reference value is any voltage value applicable to the battery 120. The power management module 112 may control the charging module 111 to supply a CC to the battery 120 until the voltage value of the battery 120 reaches the first reference value.

In operation 206, the power management module 112 of the power management circuit 110 may determine whether the voltage value of the battery 120 has reached the first reference value. If determining that the voltage value of the battery 120 has not reached the first reference value in operation 206 (206: NO), the power management module 112 of the power management circuit 110 may repeat at least one of operations 202 to 206 until the voltage applied to the battery 120 becomes the first reference value.

On the other hand, if determining that the voltage value of the battery 120 has reached the first reference value in operation 206 (206: YES), the power management module 112 of the power management circuit 110 may supply power from the external power source 102 to the battery 120 by controlling the charging module 111, so that a CV may be applied to the battery 120 in operation 208. A time period from operation 202 until the voltage value of the battery 120 reaches the first reference value may be the first time interval, that is, a CC interval. The power management module 112 may control the sensor module 113 to continuously measure the voltage value of the battery 120 until the voltage value of the battery 120 reaches the first reference value.

In operation 210, the power management module 112 of the power management circuit 110 may determine whether the current value of the battery 120 is smaller than a second reference value. The second reference value may be any DC current value for eliminating an AC voltage component applied to the internal resistor of the battery 120 and fully charge the cell of the battery 120. The power management module 112 may determine the second reference value arbitrarily, and the second reference value may be close to 0 (for example, 0.0001 A). A time period from operation 208 until the current value applied to the battery 120 becomes smaller than the second reference value may be the second time interval, that is, a CV interval.

If determining that the current value of the battery 120 is equal to or larger than the second reference value in operation 210 (210: NO), the power management module 112 of the power management circuit 110 may continuously supply power to the battery 120 until the current value of the battery 120 becomes the second reference value by repeating operations 208 and 210.

On the other hand, if determining that the current value of the battery 120 is smaller than the second reference value in operation 210 (210: YES), the power management module 112 of the power management circuit 110 may control the charging module 111 to terminate power supply from the external power source 102 to the battery 120 in operation 212. According to an embodiment of the present disclosure, the voltage value applied to the battery 120 may increase slightly according to an impedance variation of the battery 120 while performing operations 208 and 210, and the slightly increased voltage value may be a (maximum) voltage value based on the capacitance of the battery 120.

According to an embodiment of the present disclosure, a method for operating an electronic device that is electrically connected to each of a battery and an external power source and supplies power to the battery may include supplying power from the external power source to the battery so that a substantially CC may be applied to the battery during a first time interval, supplying power from the external power source to the battery so that a substantially CV may be maintained in the battery during a second time interval, sensing a current value applied to the battery and a voltage value of the battery, and determining a duration of the first time interval based on at least part of the sensed current value and the sensed voltage value.

According to an embodiment of the present disclosure, the method for operating the electronic device may further include sensing a current value applied to the battery or a voltage value of the battery during the first time interval. The method for operating the electronic device may further include, if the voltage value of the battery reaches a maximum voltage value applicable to the battery, determining termination of both of the first time interval and the second time interval.

According to an embodiment of the present disclosure, the determination of a duration of the first time interval based on at least part of the sensed current value and the sensed voltage value includes determining an internal resistance value of the battery based on the at least part of the sensed current value and the sensed voltage value, and changing the duration of the first time interval based on at least part of the internal resistance value. The method for operating the electronic device may further include, if the voltage value of the battery becomes the first reference value during the first time interval, checking a current value applied to the battery, and controlling power supply to the battery to make the checked current value equal to a predetermined second reference value.

According to an embodiment of the present disclosure, the determination of an internal resistance value of the battery based on the at least part of the sensed current value and the sensed voltage value may include determining an AC voltage value applied to the battery based on at least part of a ratio between a variation in the sensed current value and a variation in the sensed voltage value during the first time interval, and determining the internal resistance value based on at least part of the AC voltage value. The method may further include determining a first reference value to which the voltage value of the battery is to reach during the first time interval, based on at least part of the internal resistance value of the battery.

The determination of a duration of the first time interval based on at least part of the sensed current value and the sensed voltage value may include controlling power supply to the battery to apply a CC to the battery until the voltage value of the battery reaches the first reference value. The method may further include maintaining, as the first reference value, a value calculated by subtracting a voltage value applied to the internal resistor of the battery from the voltage value of the battery during the second time interval, and, if a current value applied to the battery is equal to or smaller than a predetermined second reference value, determining termination of the second time interval.

The method may further include, if the voltage value of the battery becomes the first reference value during the first time interval, checking a current value applied to the battery, and controlling power supply to the battery to make the checked current value equal to a predetermined second reference value.

Figure 3:
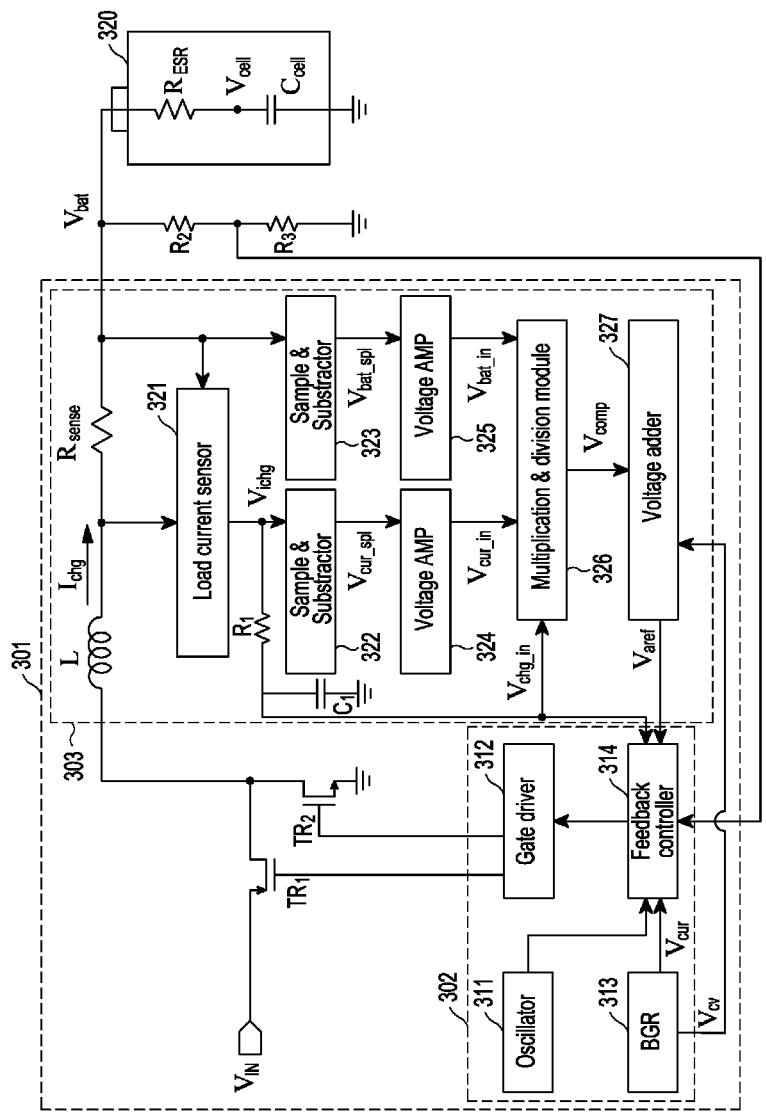
FIG. 3 illustrates an electronic device for charging a battery according to various embodiments of the present disclosure.

FIG. 3 illustrates an electronic device for charging a battery according to various embodiments of the present disclosure.

Referring to FIG. 3, an electronic device 301 may be electrically connected to a battery 320 (e.g., battery 120). The electronic device 301 may be configured to include a control block 302 and a compensation block 303. The electronic device 301 may be configured to include or not to include a battery 320 (e.g., battery 120).

According to an embodiment of the present disclosure, an input voltage VIN of power received from the external power source 102 may be transmitted to an inductor L connected through a first transistor $TR_1$ and to a ground through a second transistor $TR_2$. Also, a charging current flowing through the inductor L is $I_{chg}$. A resistor $R_{sense}$ may be used for a load current sensor 321 to measure a current value or voltage value applied to the battery 320. A voltage $V_{bat}$ applied after the resistor $R_{sense}$ may be applied to the battery 320 and thus to an internal resistor $R_{ESR}$ and a cell capacitor $C_{cell}$ of the battery 320. Herein, a voltage $V_{cell}$ may be applied to the cell capacitor $C_{cell}$. Also, the voltage $V_{bat}$ may be divided to two resistors $R_2$ and $R_3$. The voltage applied to the resistor $R_2$ may be provided to a feedback controller 314.

According to an embodiment of the present disclosure, the current $I_{chg}$ may be sensed and may also be converted to a voltage $V_{ichg}$ by the load current sensor 321. The voltage $V_{ichg}$ may be applied to a low pass filter including a resistor $R_1$ and a capacitor $C_1$ or input to a sample and subtractor 322. The sample & subtractor 322 may convert the voltage $V_{ichg}$ to a voltage $V_{cur\_spl}$. The voltage $V_{cur\_spl}$ may be input to a voltage amplifier (AMP) 324 and the voltage AMP 324 may convert the voltage $V_{cur\_spl}$ to a voltage $V_{cur\_in}$. The voltage $V_{cur\_in}$ may be input to a multiplication & division module 326. The voltage $V_{bat}$ may also be input to a sample & subtractor 323. The sample & subtractor 323 may convert the voltage $V_{bat}$ to a voltage $V_{bat\_spl}$. The voltage $V_{bat\_spl}$ may be input to a voltage AMP 325 and the voltage AMP 325 may convert the voltage $V_{bat\_spl}$ to a voltage $V_{bat\_in}$.

According to an embodiment of the present disclosure, the voltages $V_{cur\_in}$ and $V_{bat\_in}$ output from the voltage AMPs 324 and 325 may be input to the multiplication & division module 326. A voltage $V_{chg\_in}$ that has passed the low pass filter may also be input to the multiplication & division module 326. The multiplication & division module 326 may output a voltage $V_{comp}$ and the voltage $V_{comp}$ may be input to a voltage adder 327. The voltage adder 327 may output a voltage $V_{aref}$ and the voltage $V_{aref}$ may be input to the feedback controller 314. The voltages $V_{aref}$ and $V_{chg\_in}$ may be input to the feedback controller 314. The feedback controller 314 may also receive a signal from an oscillator 311 and a voltage $V_{cur}$ from a band gap reference signal generator (BGR) 313.

The feedback controller 314 may generate a control signal for controlling a gate driver 312 based on at least one of the voltages $V_{cur}$, $V_{chg\_in}$, and $V_{aref}$ and the voltage applied to the resistor $R_2$ and provide the control signal to the gate driver 312. The gate driver 312 may control on/off of the two transistors, $TR_1$ and $TR_2$, that is, switches based on the control signal.

Referring to FIG. 3, a battery voltage $V_{bat}$ may include a DC component $V_{BAT}$ and an AC component $v_{bat}$. The battery voltage $V_{bat}$ may be the sum of voltages applied to the battery cell and the internal resistor. In FIG. 3, the battery cell is represented as a capacitor $C_{cell}$ and the internal resistor is denoted by $R_{ESR}$. The current $I_{chg}$ may be a current for charging the battery 320, and currents $I_{CHG}$ and $i_{chg}$ may be the AC and DC components of the charging current $I_{chg}$, respectively.

Since the capacitance of the cell $C_{cell}$ of the battery is generally very large, it may be assumed that a cell voltage is equal for a short time, that is, during one period in which each of the transistors $TR_1$ and $TR_2$ are switched once. Therefore, the AC component $v_{bat}$ of the battery voltage $V_{bat}$ generated by the AC component of the charging current may be regarded as generated from the internal resistor $R_{ESR}$ or approximated.

The power management module 112 may calculate the value of the internal resistor $R_{ESR}$ by calculating a ratio between the magnitude of the AC component of the charging current and the magnitude of the AC component of the battery voltage $V_{bat}$. Further, a voltage value applied to the internal resistor $R_{ESR}$ may be calculated by multiplying a DC current by the value of the internal resistor $R_{ESR}$.

According to an embodiment of the present disclosure, if a reference voltage at which the charging current is reduced without consideration of the internal resistor $R_{ESR}$ is $V_{cv\_org}$, the voltage $V_{aref}$ which compensates for the effect of the internal resistor $R_{ESR}$ may be obtained by adding a value $V_{cv\_delta}$ generated by the internal resistor $R_{ESR}$ to the reference voltage $V_{cv\_org}$. According to an embodiment of the present disclosure, the power management circuit 110 may delay switching to a period during which the charging current is decreased, based on the value $V_{aref}$ that compensates for the effect of the internal resistor $R_{ESR}$, thereby reducing the charging time. Equations 1 and 2 below are formulas by which to calculate a voltage applied to the battery.

$$V_{bat} = \qquad \text{Equation 1}$$
$$V_{cell} + V_{ESR} = \frac{1}{C_{cell}} \cdot \int (I_{CHG} + i_{chg}) dt + R_{ESR}(I_{CHG} + i_{chg})$$

$$V_{bat} = \frac{1}{C_{cell}} \cdot \int i_{chg} dt + R_{ESR} \cdot i_{chg} \approx R_{ESR} \cdot i_{chg} \qquad \text{Equation 2}$$

The value $V_{cv\_comp}$ that compensates for the effect of the internal resistor $R_{ESR}$ may be calculated by Equation 3.

$$\therefore R_{ESR} = \frac{V_{bat}}{i_{chg}} \Rightarrow V_{aref} = V_{cv} + \frac{V_{bat}}{ichg} \times I_{CHG} \qquad \text{Equation 3}$$

According to an embodiment of the present disclosure, the charging time of the battery 320 may be reduced in the following manner. In the compensation block 303, the charging current $I_{chg}$ may be converted to the voltage $V_{ichg}$ by the load current sensor 321. The DC component of the charging current $I_{chg}$, the voltage $V_{chg\_in}$ may be produced, as the voltage $V_{ichg}$ passes through the resistor $R_1$ and the capacitor $C_1$ which serve as an RC low pass filter, and the voltage $V_{ichg}$ may be input to the multiplication & division module 326. The voltage $V_{ichg}$ is converted to the AC component of the charging current $I_{chg}$, the voltage $V_{cur\_spl}$ in the sample & subtractor 322, and the voltage $V_{cur\_spl}$ may be input to the multiplication & division module 326.

The battery voltage $V_{bat}$ is converted to the AC component $V_{bat\_spl}$ of the battery voltage $V_{bat}$ in the sample and subtractor 323, and the voltage $V_{bat\_spl}$ may be input to the multiplication & division module 326. According to an embodiment of the present disclosure, the voltages $V_{cur\_spl}$ and $V_{bat\_spl}$ may be amplified respectively through the voltage AMPs 324 and 325 and input to the multiplication & division module 326. The multiplication & division module 326 may calculate the voltage $V_{comp}$ applied to the internal resistor $R_{ESR}$ using the voltage $V_{cur\_spl}$ (if amplified, $V_{cur\_in}$), the voltage $V_{bat\_spl}$ (if amplified, $V_{bat\_in}$), and the voltage $V_{chg\_in}$, and the voltage adder 327 may calculate the reference voltage $V_{aref}$ for switching to a CV interval by adding the existing CV switching voltage $V_{cv}$ and the voltage $V_{comp}$. According to an embodiment of the present disclosure, the above-stated values may be changed to predetermined ratios according to the circuit design of each component.

The electronic device 301 may supply a CC to the battery 320 until the voltage $V_{bat}$ of the battery 320 reaches the reference voltage $V_{aref}$. Therefore, the electronic device 301 may eliminate or decrease a time period during which the charging current to the battery 320 is decreased. That is, since the CC is applied to the battery 320 for a longer time and more current is applied to the battery 320 than before the compensation, the battery 320 is fully charged faster.

According to an embodiment of the present disclosure, a part of the components illustrated in FIG. 3 may be integrated or omitted. For example, the sample & subtractor 322, the sample & subtractor 323, and the voltage AMPs 324 and 325 may be integrated or omitted.

Figure 4A:
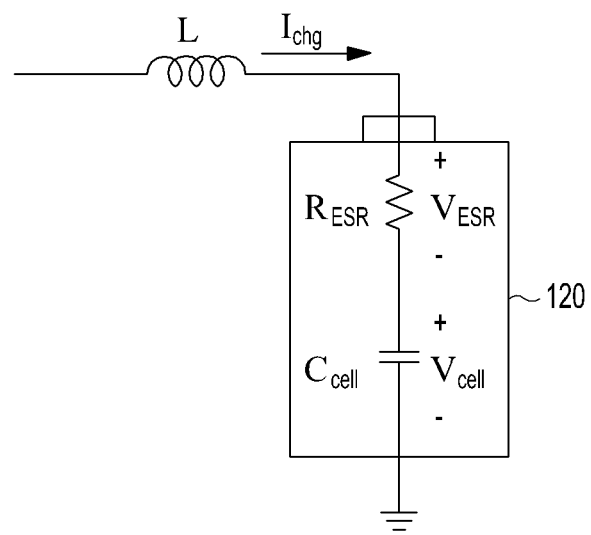
FIG. 4A illustrates a battery charged by an electronic device according to various embodiments of the present disclosure.
Figure 4B:
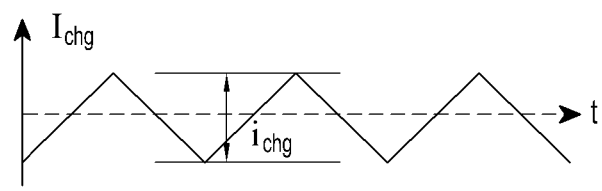
FIGS. 4B and 4C are graphs illustrating current values applied to an internal resistor of a battery and voltage values of the internal resistor of the battery according to various embodiments of the present disclosure.
Figure 4C:
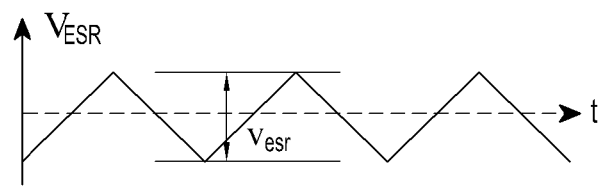

FIG. 4A illustrates a battery charged by an electronic device according to various embodiments of the present disclosure, and FIGS. 4B and 4C are graphs illustrating current values applied to an internal resistor of a battery and voltage values of the internal resistor of the battery according to various embodiments of the preset disclosure.

Referring to FIG. 4A, the battery 320 may include the internal resistor $R_{ESR}$ and the capacitor $C_{cell}$. The current $I_{chg}$ for charging the battery 320 may be produced by conversion in the inductor L, as illustrated in FIG. 3, and may be applied to the internal resistor $R_{ESR}$ and the capacitor $C_{cell}$ of the battery 320. The current $I_{chg}$ for charging the battery 320 may include a DC component and an AC component.

Referring to FIG. 4B, a graph illustrates the AC component $i_{chg}$ of the current $I_{chg}$. As illustrated in FIG. 4B, the AC current $i_{chg}$ applied to the internal resistor $R_{ESR}$ may be a ripple current.

As described before, since the capacitance of the cell $C_{cell}$ of the battery 120 is generally very large, a cell voltage is equal for a short time. Therefore, the AC component $v_{bat}$ of the battery voltage $V_{bat}$ generated by the AC component $i_{chg}$ of the charging current $I_{chg}$ may be considered to be generated by the internal resistor $R_{ESR}$ or approximated.

Referring to FIG. 4C, a graph of the voltage value $V_{ESR}$ of the internal resistor $R_{ESR}$ is illustrated. Because the voltage value $V_{ESR}$ of the internal resistor $R_{ESR}$ is the AC component $i_{chg}$ of the charging current $I_{chg}$ applied to the internal resistor $R_{ESR}$, it may be a ripple voltage that varies with passage of time, as illustrated in FIG. 4C.

Figure 5:
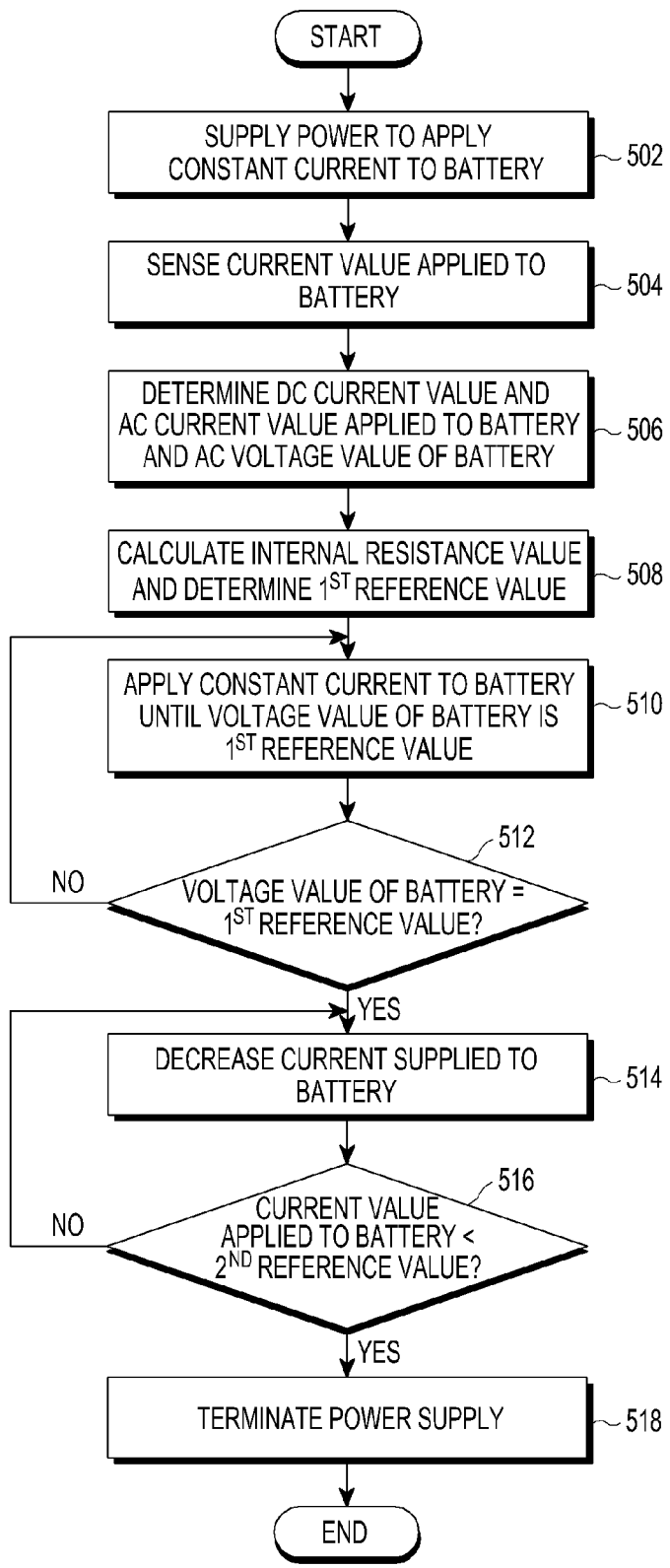
FIG. 5 is a flow chart of a method for charging a battery according to various embodiments of the present disclosure.

FIG. 5 is a flow chart of a method for charging a battery in an electronic device according to various embodiments of the present disclosure.

Referring to FIG. 5, the power management module 112 of the power management circuit 110 may control the charging module 111 to supply power from the external power source to the battery 120 so that a CC may be applied to the battery 120 by the external power source 102 in operation 502. In operation 504, the sensor module 113 of the power management circuit 110 may sense a current value applied to the battery 120. According to an embodiment of the present disclosure, operations 502 and 504 may be performed substantially at the same time. The power management module 112 of the power management circuit 110 may control the sensor module 113 to measure a current value applied to the battery 120 every predetermined time (for example, every 5 ms), simultaneously with supplying power to the battery 120 through the charging module 111.

According to an embodiment of the present disclosure, the current of power supplied from the external power source 102 to the battery 120 may include a DC current or an AC current. Further, since the battery 120 has a predetermined capacity, the power management module 112 of the power management circuit 110 may calculate the voltage value of the battery 120 in advance according to the capacity of the battery 120. According to an embodiment of the present disclosure, if a CC is supplied to the battery 120 by the external power source 102, the voltage value of the battery 120 may increase in proportion to a time during which the CC is supplied. If the AC current is additionally applied to the internal resistor of the battery 120, a voltage substantially applied to the battery 120 may be the sum of the voltage based on the capacity of the battery 120 and the voltage applied to the internal resistor.

In operation 506, the power management module 112 of the power management circuit 110 may determine (or calculate) a DC current value and an AC current value of the current supplied to the battery 120 and an AC voltage value of the battery 120. According to an embodiment of the present disclosure, the load current sensor 321 illustrated in FIG. 3 may measure a current value of the DC current $I_{chg}$ that has passed through the inductor L (low pass filter) out of the power supplied from the external power source 102. According to an embodiment of the present disclosure, the load current sensor 321 may measure the voltage value of the battery 120 in operation 504. Since the current applied to the battery 120 includes both an AC component and a DC component, the voltage of the battery 120 may also include an AC component and a DC component. In FIG. 5, it may be assumed that the AC voltage of the battery 120 is applied to the internal resistor of the battery 120. The power management circuit 110 may measure a current value applied to the battery 120 and a voltage value of the battery 120 every predetermined time and calculate an internal resistance value of the battery 120 using a ratio between a current variation and a voltage variation during a predetermined time period.

In operation 508, the power management module 112 of the power management circuit 110 may determine (or calculate) an internal resistance value of the battery 120 and a first reference value based on at least part of the internal resistance value. The power management module 112 of the power management circuit may arbitrarily determine the first reference value using the voltage value of the battery 120. The first reference value may be the sum of the voltage value of the cell of the battery 120 and the voltage value of the internal resistor of the battery 120. Since the first time interval spans from the starting time of charging until the sum of the voltage value of the cell of the battery 120 and the voltage value of the internal resistor of the battery 120 reaches the first reference value, the power management module 112 may set the first reference value to be approximate to or larger than a maximum voltage based on the actual capacitance of the cell of the battery 120. According to an embodiment of the present disclosure, since the internal resistance value of the battery 120 is determined (or calculated) in operation 508, the power management module 112 of the power management circuit 110 may determine the first reference value to be the sum of a value close to the maximum voltage value (for example, a value in a range of ±5% of the maximum voltage value) based on the actual capacitance of the cell of the battery 120 and the voltage value of the internal resistor.

In operation 510, the power management module 112 of the power management circuit 110 may control the charging module 111 to supply a CC to the battery 120 until the voltage value of the battery 120 reaches the first reference value. In operation 512, the power management module 112 of the power management circuit 110 may determine whether the voltage value of the battery 120 has reached the first reference value.

If the voltage value of the battery 120 has not reached the first reference value in operation 512(512: NO), the power management module 112 of the power management circuit 110 may control the charging module 111 to supply a CC to the battery 120 until the voltage value of the battery 120 becomes the first reference value in operation 510. On the other hand, if the voltage value of the battery 120 has reached the first reference value in operation 512(512: YES), the power management module 112 of the power management circuit 110 may decrease a current value supplied to the battery 120 in operation 514. In operation 514, the power management module 112 of the power management circuit 110 may control the charging module 111 to decrease the amount of a current applied to the battery 120, while maintaining the voltage of the battery 120 at a value close to the first reference value. If the amount of the current applied to the battery 120 is decreased, the AC current applied to the internal resistor of the battery 120 becomes close to 0 and thus the voltage value of the internal resistor also becomes close to 0. Therefore, the internal resistance component is (substantially) eliminated and only the cell of the battery 120 may be charged.

In operation 516, the power management module 112 of the power management circuit 110 may determine whether a current value applied to the battery 120 is below a second reference value. The power management module 112 of the power management circuit 110 may arbitrarily set the second reference value, and the second reference value may be close to 0.

If the current value applied to the battery 120 is not below the second reference value, that is, the current value applied to the battery 120 is equal to or larger than the second reference value in operation 516(516: NO), the power management module 112 of the power management circuit 110 may control the charging module 111 to continuously supply power to the battery 120 until the current value of the battery 120 may drop to the second reference value by repeating operation 514.

On the contrary, if the current value applied to the battery 120 is below the second reference value, that is, the current value applied to the battery 120 is smaller than the second reference value in operation 516(516: YES), the power management module 112 of the power management circuit 110 may control the charging module 111 to terminate power supply from the external power source 102 to the battery 120 in operation 518.

Figure 6A:
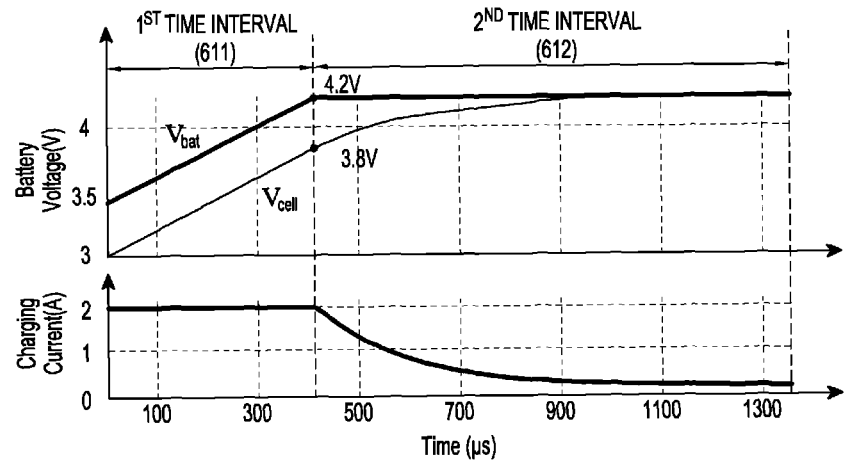
FIGS. 6A and 6B are graphs illustrating a current and a voltage applied to a battery by an electronic device according to various embodiments of the present disclosure.
Figure 6B:
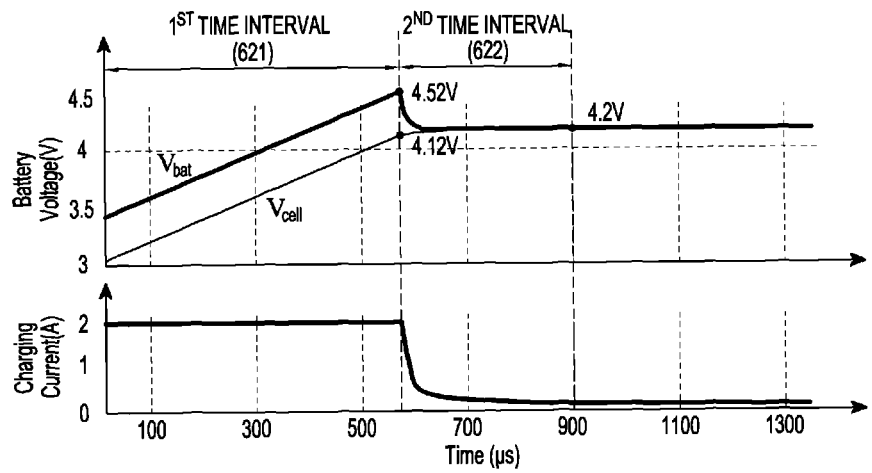

FIGS. 6A and 6B are graphs illustrating a current and a voltage applied to a battery in an electronic device according to various embodiments of the present disclosure.

Referring to FIGS. 6A and 6B, the charging times of the battery 120 are examples and may vary depending on the capacity of the battery 120 or a current supplied to the battery 120. In particular, Referring to FIG. 6A, a graph illustrates a current and a voltage applied to the battery 120 when a voltage applied to the internal resistor of the battery 120 is not compensated. Referring to FIG. 6B, a graph illustrates a current and a voltage applied to the battery 120 when a voltage applied to the internal resistor of the battery 120 is compensated. Current values and voltage values applied to the battery 120 are merely examples illustrated in FIGS. 6A and 6B. In FIGS. 6A and 6B, it may be assumed that the voltage of the fully charged battery 120 is 4.2V.

Referring to FIGS. 6A and 6B, the charging time of the battery 120 may include a first time interval 611 or 621 during which a CC is supplied to the battery 120 (that is, a CC interval) and a second time interval 612 or 622 during which the voltage value of the battery 120 is maintained constant (that is, a CV interval). The total charging time of the battery 120 may be the sum of the first time interval 611 or 621 and the second time interval 612 or 622.

Referring to FIG. 6A, a graph illustrates the charging time of the battery 120 when the battery 120 is charged with no regard to the internal resistor of the battery 120. That is, a CC (for example, 2 A) may be applied from the external power source 106 to the battery 120 during the first time interval 611 (for example, 0 μs~420 μs). When the first time interval 611 ends, the voltage $V_{bat}$ applied to the battery 120 may be 4.2V, whereas the voltage $V_{cell}$ applied to the cell of the battery 120 may be 3.8V. That is, since the cell of the battery 120 is charged with as much power as 3.8V during the first time interval 611, a voltage of 0.4V may further be needed to fully charge the cell. Therefore, while maintaining a CV applied to the battery 120 during the CV interval as long as the second time interval 612 (for example, 420 μs~1300 μs), that is, during the second time interval 612, the electronic device 101 gradually decreases the amount of a current applied to the battery 120 to thereby charge the battery 120 until the voltage of the cell of the battery 120 is 4.2V.

If the battery 120 is charged in the manner illustrated in FIG. 6A, the difference between the total voltage value of the battery 120 and the voltage value of the cell of the battery 120 may be narrower. In other words, the cell of the battery 120 may be fully charged. However, since the amount of the current supplied to the battery 120 is decreased during the CV interval, a longer time may be taken to fully charge the battery 120.

Referring to FIG. 6B, a graph illustrates the charging time of the battery 120 when the battery 120 is charged in consideration with a voltage value of the internal resistor of the battery 120. That is, a CC (for example, 2 A) may be applied from the external power source 106 to the battery 120 during the first time interval 621, that is, the CC interval (for example, 0 μs~560 μs). According to an embodiment of the present disclosure, the power management circuit 110 of the electronic device 101 may calculate an internal resistance value of the battery 120 during the CC interval, that is, the first time interval 621. The power management circuit 110 may calculate the internal resistance value using current values and voltage values of the battery 120 measured during at least a part (for example, 100 μs~500 μs) of the first time interval 621. The power management circuit 120 may determine a voltage value of the battery 120 to be charged during the first time interval 621, referring to the internal resistance value. Referring to FIG. 6B, the power management circuit 110 may determine the voltage value of the battery 120 to be charged during the first time interval 621 to be 4.52V. The power management circuit 110 may maintain the first time interval 621, that is, the CC interval by supplying a CC to the battery 120 until the voltage value of the battery 120 becomes 4.52V.

In FIG. 6B, a CC (for example, 2 A) is supplied to the battery 120 until the voltage value of the battery 120 becomes a voltage value (for example, 4.52V) including even the voltage value of the internal resistor. Therefore, when the first time interval 621 ends, the voltage $V_{bat}$ of the battery 120 may be 4.52V and the voltage $V_{cell}$ applied to the cell of the battery 120 may be about 4.12V. That is, the cell of the battery 120 may be charged with as much power as 4.12V during the first time interval 621. Since the voltage of the fully charged battery 120 is 4.2V, if the voltage of the cell of the battery 120 increases by 0.08V, the battery 120 may be fully charged. For example, if the first time interval 611 of FIG. 6A is 400 μs, the first time interval 621 of FIG. 6B is 550 μs, which may be longer than when the battery 120 is charged in the manner illustrated in FIG. 6A. However, if it is assumed that the second time interval 612 of FIG. 6A is 950 μs, the second time interval 622 of FIG. 6B is 250 μs, which may be shorter than when the battery 120 is charged in the manner illustrated in FIG. 6A. The total charging time of the battery 120 which is the sum of the first time interval 611 or 621 and the second time interval 621 or 622 may be shorter in the charging scheme of FIG. 6B than in the charging scheme of FIG. 6A. The power management circuit 110 of the electronic device 101 may control reduction of the total charging time of the battery 120 by controlling the duration of the first time interval 621 as illustrated in FIG. 6B.

Figure 7:
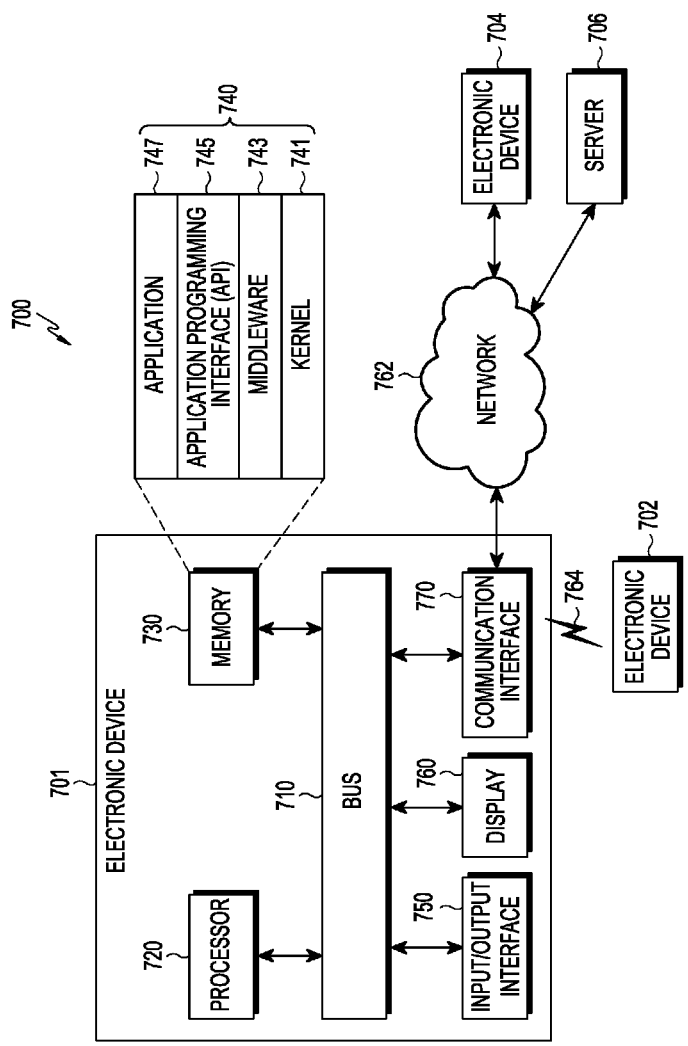
FIG. 7 is a block diagram of a network environment including an electronic device according to various embodiments of the present disclosure.

FIG. 7 is a block diagram of a network environment including an electronic device according to various embodiments of the present disclosure.

Referring to FIG. 7, an electronic device 701 in a network environment 700 according to various embodiments is illustrated. The electronic device 701 may include a bus 710, a processor 720, a memory 730, an input/output (I/O) interface 750, a display 760, and a communication interface 770. In various embodiments, at least one of the components may be omitted in the electronic device 701 or a component may be added to the electronic device 701. The electronic device 701 may have the same configuration as or a similar configuration to the electronic device 101 illustrated in FIG. 1.

The bus 710 may include a circuit that interconnects, for example, the foregoing components 720 to 770 and allows communication (for example, control messages and/or data) between the foregoing components 720 to 770.

The processor 720 may include one or more of a CPU, an AP, and a communication processor (CP). The processor 720 may, for example, execute computation or data processing related to control and/or communication of at least one other component of the electronic device 701.

According to an embodiment of the present disclosure, the processor 720 may provide overall control to the above-described operation of the power management circuit 110, for example, the operation for charging the battery 120 by supplying power to the battery 120. The processor 720 may perform all operations of the power management circuit 110 illustrated in FIG. 1 or control the power management circuit 110. Further, the processor 720 may be configured to include the power management circuit 110.

The memory 730 may include a volatile memory and/or a non-volatile memory. The memory 730 may, for example, store instructions or data related to at least one other component of the electronic device 701. According to an embodiment of the present disclosure, the memory 730 may store software and/or programs 740. The programs 740 may include, for example, a kernel 741, middleware 743, an application programming interface (API) 745, and/or application programs (or applications) 747. At least a part of the kernel 741, the middleware 743, and the API 745 may be called an operating system (OS).

The kernel 741 may control or manage system resources (for example, the bus 710, the processor 720, or the memory 730) that are used in executing operations or functions implemented in other programs (for example, the middleware 743, the API 745, or the application programs 747). Also, the kernel 741 may provide an interface for allowing the middleware 743, the API 745, or the application programs 747 to access and control or manage individual components of the electronic device 701.

The middleware 743 may serve as a medium through which the kernel 741 may communicate with, for example, the API 745 or the application programs 747 to transmit and receive data.

Also, the middleware 743 may process one or more task requests received from the application programs 747 according to priority. For example, the middleware 743 may assign a priority level for using system resources (the bus 710, the processor 720, or the memory 730) of the electronic device 701 to at least one of the application programs 747. For example, the middleware 743 may perform scheduling or load balancing for the one or more task requests by processing the one or more task requests according to the priority level assigned to the at least one application program 747.

The API 745 is an interface that may control functions that the application programs 747 provide at the kernel 741 or the middleware 743. For example, the API 745 may include at least one interface or function (for example, a command) for file control, window control, video processing, or text control.

The I/O interface 750 may, for example, act as an interface that provides a command or data received from a user or an external device to the other component(s) of the electronic device 701. Further, the I/O interface 750 may output a command or data received from the other component(s) of the electronic device 701 to the user or the external device.

The display 760 may include, for example, a liquid crystal display (LCD), a light emitting diode (LED) display, an organic LED (OLED) display, a microelectromechanical systems (MEMS) display, or an electronic paper display. The display 760 may display, for example, various types of content (for example, text, an image, a video, an icon, or a symbol) to the user. The display 760 may include a touch screen and receive, for example, a touch input, a gesture input, a proximity input, or a hovering input through an electronic pen or a user's body part.

According to an embodiment of the present disclosure, the display 760 may display the remaining power of the battery 120 electrically connected to the electronic device 701. If the remaining power of the battery 120 is equal to or lower than a predetermined threshold (for example, 25%), it may be indicated that the battery 120 needs to be charged, thus requesting charging of the battery 120 to a user. While the battery 120 is being charged by the electronic device 701, the display 760 may also display the remaining power of the battery 120. If the battery 120 is fully charged, the display 760 indicates that the battery 120 is fully charged to the user.

The communication interface 770 may establish communication, for example, between the electronic device 701 and an external device (for example, a first electronic device 702, a second electronic device 704, or a server 706). For example, the communication interface 770 may be connected to a network 762 by wireless or wired communication and communicate with the external device (for example, the second electronic device 704 or the server 706) over the network 762.

The wireless communication may be conducted using, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)), as a cellular communication protocol. The wireless communication may include, for example, short-range communication 764. The short-range communication 764 may be conducted by, for example, at least one of Wi-Fi, Bluetooth (BT), near field communication (NFC), and GNSS. GNSS may include, for example, at least one of global positioning system (GPS), global navigation satellite system (GLONASS), BeiDou navigation satellite system (hereinafter, referred to as 'BeiDou'), and Galileo, the European global satellite-based navigation system according to a used region or a bandwidth. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), and plain old telephone service (POTS). The network 762 may be a communication network, for example, at least one of a computer network (for example, local access network (LAN) or wide access network (WAN)), the Internet, and a telephone network.

Each of the first and second external electronic devices 702 and 704 may be of the same type as or a different type from the electronic device 701. According to an embodiment of the present disclosure, the server 706 may include a group of one or more servers. According to various embodiments, all or a part of operations performed in the electronic device 701 may be performed in one or more other electronic devices (for example, the electronic device 702 or 704, or the server 706). According to an embodiment of the present disclosure, if the electronic device 701 is to perform a function or a service automatically or upon request, the electronic device 701 may request at least a part of functions related to the function or the service to another device (for example, the electronic device 702 or 704 or the server 706), instead of performing the function or the service autonomously, or additionally. The other device (for example, the electronic device 702 or 704 or the server 706) may execute the requested function or an additional function and provide a result of the function execution to the electronic device 701. The electronic device 701 may provide the requested function or service based on the received result or by additionally processing the received result. For this purpose, for example, cloud computing, distributed computing, or client-server computing may be used.

Figure 8:
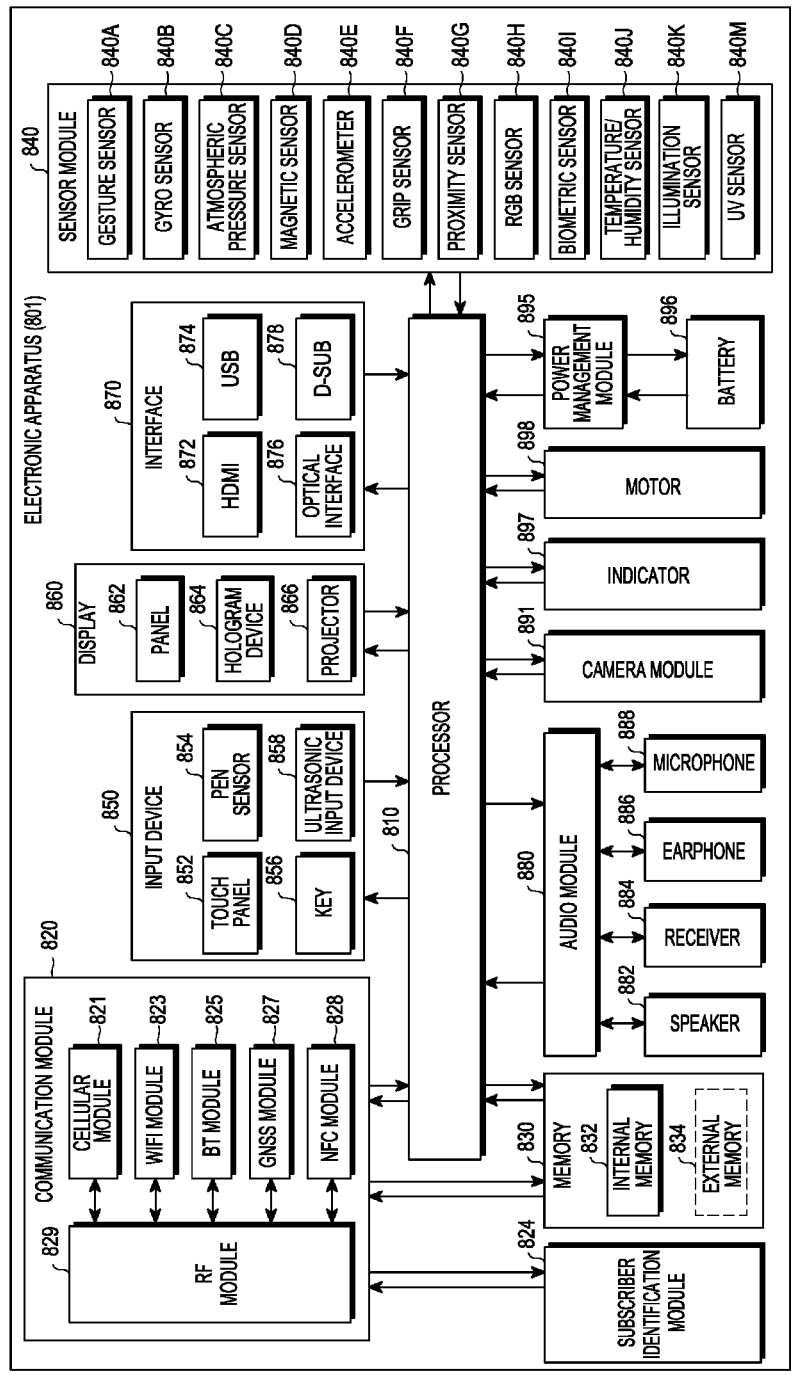
FIG. 8 is a block diagram of an electronic device according to various embodiments of the present disclosure.

FIG. 8 is a block diagram of an electronic device according to various embodiments of the present disclosure.

Referring to FIG. 8, an electronic device 801 may include the whole or at least part of the electronic device 101 illustrated in FIG. 1, or the whole or at least part of the electronic device 701 illustrated in FIG. 7. The electronic device 801 may include at least one processor (for example, AP) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may, for example, control a plurality of hardware or software components that are connected to the processor 810 by executing an OS or an application program and may perform processing or computation on various types of data. The processor 810 may be implemented, for example, as a system on chip (SoC). According to an embodiment of the present disclosure, the processor 810 may further include a graphics processing unit (GPU) and/or an image signal processor (ISP). The processor 810 may include at least a part (for example, a cellular module 821) of the components illustrated in FIG. 8. The processor 810 may load a command or data received from at least one other component (for example, a non-volatile memory), process the loaded command or data, and store various types of data in the non-volatile memory.

The communication module 820 may have the same configuration as or a similar configuration to the communication interface 770 illustrated in FIG. 7. The communication module 820 may include, for example, the cellular module 821, a Wi-Fi module 823, a BT module 825, a GNSS module 827 (for example, a GPS module, a GLONASS module, a BeiDou module, or a Galileo module), an NFC module 828, and a radio frequency (RF) module 829.

The cellular module 821 may provide services such as voice call, video call, short message service (SMS), or an Internet service through a communication network. According to an embodiment of the present disclosure, the cellular module 821 may identify and authenticate the electronic device 801 within a communication network, using the SIM (for example, a SIM card) 824. According to an embodiment of the present disclosure, the cellular module 821 may perform at least a part of the functionalities of the processor 810. According to an embodiment of the present disclosure, the cellular module 821 may include a CP.

Each of the Wi-Fi module 823, the BT module 825, the GNSS module 827, and the NFC module 828 may include, for example, a processor for processing data transmitted and received by the module. According to an embodiment of the present disclosure, at least a part (for example, two or more) of the cellular module 821, the Wi-Fi module 823, the BT module 825, the GNSS module 827, and the NFC module 828 may be included in a single IC or IC package.

The RF module 829 may transmit and receive, for example, communication signals (for example, RF signals). The RF module 829 may include, for example, a transceiver, a power amplifier module (PAM), a frequency filter, a low noise amplifier (LNA), an antenna, or the like. According to an embodiment of the present disclosure, at least one of the cellular module 821, the Wi-Fi module 823, the BT module 825, the GNSS module 827, and the NFC module 828 may transmit and receive RF signals via a separate RF module.

The SIM 824 may include, for example, a card including the SIM and/or an embedded SIM. The SIM 824 may include a unique identifier (for example, integrated circuit card identifier (ICCID)) or subscriber information (for example, international mobile subscriber identity (IMSI)).

The memory 830 (for example, the memory 730) may include, for example, an internal memory 832 or an external memory 834. The internal memory 832 may be at least one of, for example, a volatile memory (for example, dynamic random access memory (DRAM), static RAM (SRAM), or synchronous dynamic RAM (SDRAM)), and a non-volatile memory (for example, one time programmable read only memory (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD)).

The external memory 834 may further include, for example, a flash drive such as a compact flash (CF), a secure digital (SD), a micro-SD, a mini-SD, an extreme digital (xD), a multi-media card (MMC), or a memory stick. The external memory 834 may be operatively and/or physically coupled to the electronic device 801 via various interfaces.

The sensor module 840 may, for example, measure physical quantities or detect operational states associated with the electronic device 801, and convert the measured or detected information into electric signals. The sensor module 840 may include at least one of, for example, a gesture sensor 840A, a gyro sensor 840B, an atmospheric pressure sensor 840C, a magnetic sensor 840D, an accelerometer 840E, a grip sensor 840F, a proximity sensor 840G, a color sensor (for example, a red, green, blue (RGB) sensor) 840H, a biometric sensor 840I, a temperature/humidity sensor 840J, an illumination sensor 840k, and an ultra violet (UV) sensor 840M. Additionally or alternatively, the sensor module 840 may include, for example, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor. The sensor module 840 may further include a control circuit for controlling one or more sensors included therein. According to various embodiments, the electronic device 801 may further include a processor configured to control the sensor module 840, as a part of or separately from the processor 810. Thus, while the processor 810 is in a sleep state, the control circuit may control the sensor module 840.

The input device 850 may include, for example, a touch panel 852, a (digital) pen sensor 854, a key 856, or an ultrasonic input device 858. The touch panel 852 may operate in at least one of, for example, capacitive, resistive, infrared, and ultrasonic schemes. The touch panel 852 may further include a control circuit. The touch panel 852 may further include a tactile layer to thereby provide haptic feedback to the user.

The (digital) pen sensor 854 may include, for example, a detection sheet which is a part of the touch panel or separately configured from the touch panel. The key 856 may include, for example, a physical button, an optical key, or a keypad. The ultrasonic input device 858 may identify data by detecting, using a microphone (for example, a microphone 887), ultrasonic signals generated from an input tool.

The display 860 (for example, the display 760) may include a panel 862, a hologram device 864, or a projector 866. The panel 862 may have the same configuration as or a similar configuration to the display 760 illustrated in FIG. 7. The panel 862 may be configured to be, for example, flexible, transparent, or wearable. The panel 862 and the touch panel 852 may be implemented as a single module. According to an embodiment of the present disclosure, the panel 862 may include a pressure sensor (or a force sensor) for measuring the force of the pressure of a user touch. The pressure sensor may be integrated with the touch panel 852 or may include one or more sensors, separately from the touch panel 852. The hologram device 864 may utilize the interference of light waves to provide a three-dimensional image in empty space. The projector 866 may provide an image by projecting light on a screen. The screen may be positioned, for example, inside or outside the electronic device 801. According to an embodiment of the present disclosure, the display 860 may further include a control circuit for controlling the panel 862, the hologram device 864, or the projector 866.

The interface 870 may include, for example, an HDMI 872, a USB 874, an optical interface 876, or a D-subminiature (D-sub) 878. The interface 870 may be included, for example, in the communication interface 770 illustrated in FIG. 7. Additionally or alternatively, the interface 870 may include, for example, a mobile high-definition link (MHL) interface, an SD/multimedia card (MMC) interface, or an infrared data association (IrDA) interface.

The audio module 880 may convert a sound to an electrical signal, and vice versa. At least a part of the components of the audio module 880 may be included, for example, in the I/O interface 750 illustrated in FIG. 7. The audio module 880 may process sound information input into, or output from, for example, a speaker 882, a receiver 884, an earphone 886, or the microphone 888.

The camera module 891 may capture, for example, still images and a video. According to an embodiment of the present disclosure, the camera module 891 may include one or more image sensors (for example, a front sensor or a rear sensor), a lens, an ISP, or a flash (for example, an LED or a xenon lamp).

The power management module 895 may manage, for example, power of the electronic device 801. According to an embodiment of the present disclosure, the power management module 895 may include a power management IC (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery fuel gauge may measure, for example, a charge level, a voltage while charging, current, or temperature of the battery 896. The battery 896 may include, for example, a rechargeable battery and/or a solar battery.

The indicator 897 may indicate specific states of the electronic device 801 or a part of the electronic device 801 (for example, the processor 810), for example, boot status, message status, or charge status. The motor 898 may convert an electrical signal into a mechanical vibration and generate vibrations or a haptic effect. While not shown, the electronic device 801 may include a processing device for supporting mobile TV (for example, a GPU). The processing device for supporting mobile TV may process media data compliant with, for example, digital multimedia broadcasting (DMB), digital video broadcasting (DVB), or MediaFLO.

Each of the above-described components of the electronic device may include one or more parts and the name of the component may vary with the type of the electronic device. According to various embodiments, the electronic device may be configured to include at least one of the aforedescribed components. Some component may be omitted from or added to the electronic device. According to various embodiments, one entity may be configured by combining a part of the components of the electronic device, to thereby perform the same functions of the components prior to the combining.

Figure 9:
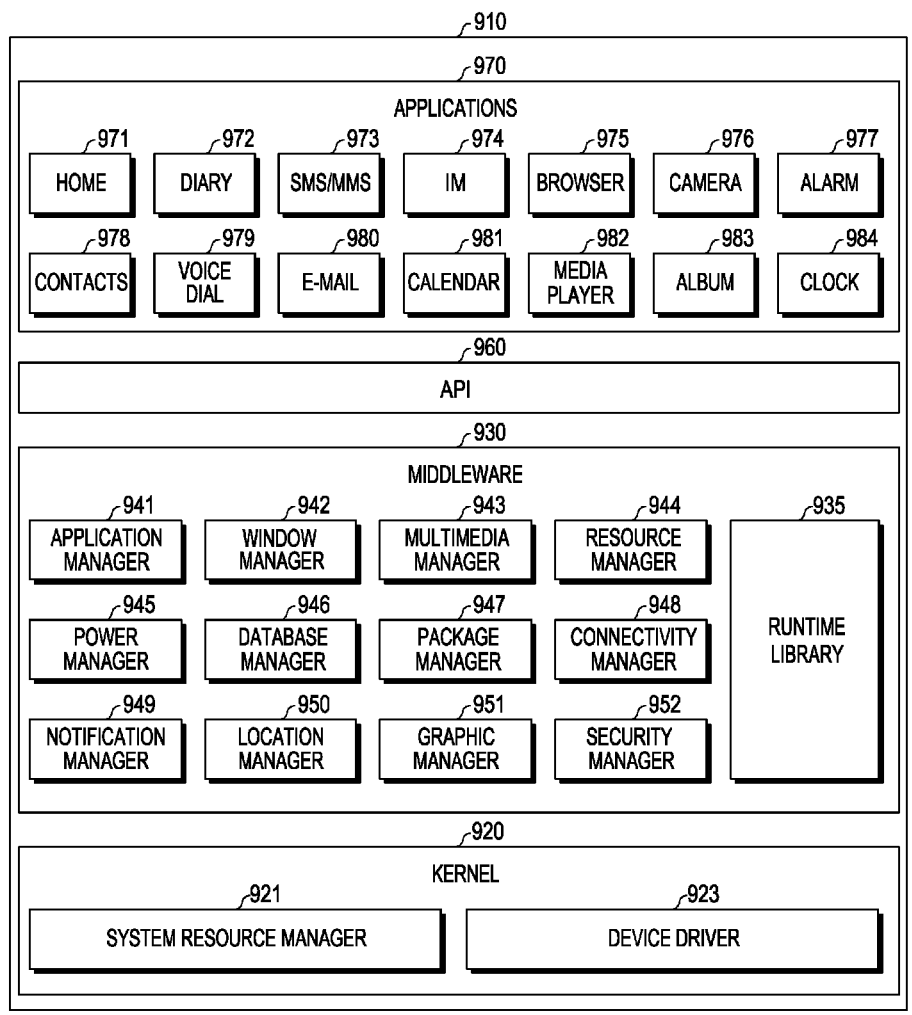
FIG. 9 is a block diagram of a programming module according to various embodiments of the present disclosure.

FIG. 9 is a block diagram of a programming module according to various embodiments of the present disclosure.

Referring to FIG. 9, according to an embodiment of the present disclosure, a programming module 910 (for example, the programs 740) may include an OS that controls resources related to an electronic device (for example, the electronic device 701) and/or various applications executed on the OS (for example, the application programs 747). For example, the OS may be Android®, iOS®, Windows®, Symbian®, Tizen®, Bala®, or the like.

The programming module 910 may include a kernel 920, middleware 930, an API 960, and/or applications 970. At least a part of the programming module 910 may be preloaded on the electronic device or downloaded from an external electronic device (for example, the electronic device 702 or 704, or the server 706).

The kernel 920 (for example, the kernel 741) may include, for example, a system resource manager 921 and/or a device driver 923. The system resource manager 921 may control, allocate, or deallocate system resources. According to an embodiment of the present disclosure, the system resource manager 921 may include a processor manager, a memory manager, or a file system manager. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930 may, for example, provide a function required commonly for the applications 970 or provide various functionalities to the applications 970 through the API 960 so that the applications 970 may efficiently use limited system resources available within the electronic device. According to an embodiment of the present disclosure, the middleware 930 (for example, the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 935 may include, for example, a library module that a complier uses to add a new function in a programming language during execution of an application 970. The runtime library 935 may perform I/O management, memory management, a function related to arithmetic function, or the like.

The application manager 941 may manage, for example, the life cycle of at least one of the applications 970. The window manager 942 may manage graphical user interface (GUI) resources used for a screen. The multimedia manager 943 may determine formats required to play back various media files and may encode or decode a media file using a coder/decoder (CODEC) suitable for the format of the media file. The resource manager 944 may manage resources such as a source code of at least one application 970, a memory, or storage space.

The power manager 945 may, for example, manage a battery or a power source by operating in conjunction with a basic input/output system (BIOS) and may provide power information required for an operation of the electronic device. The database manager 946 may manage a database for at least one of the applications 970 so that the database may be generated, searched, or modified. The package manager 947 may manage installation or update of an application distributed as a package file.

The connectivity manager 948 may manage, for example, wireless connectivity of Wi-Fi, BT, or the like. The notification manager 949 may indicate or notify an event such as message arrival, a schedule, a proximity alarm, or the like in a manner that does not bother a user. The location manager 950 may mange location information about the electronic device. The graphic manager 951 may manage graphical effects to be provided to the user or related user interfaces. The security manager 952 may provide an overall security function required for system security, user authentication, and the like. In an embodiment of the present disclosure, if the electronic device (for example, the electronic device 701) has a telephony function, the middleware 930 may further include a telephony manager to manage a voice or video call function of the electronic device.

A new middleware module may be created and used by combining various functions of the above-described component modules in the middleware 930. The middleware 930 may provide a customized module for each OS type in order to provide differentiated functions. In addition, the middleware 930 may dynamically delete a part of the existing components or add a new component.

The API 960 (for example, the API 745) is, for example, a set of API programming functions, which may be configured differently according to an OS. For example, in the case of Android or iOS, one API set may be provided per platform, whereas in the case of Tizen, two or more API sets may be provided per platform.

The applications 970 (for example, the application programs 747) may include, for example, one or more applications capable of providing functions such as home 971, dialer 972, SMS/multimedia messaging service (MMS) 973, instant message (IM) 974, browser 975, camera 976, alarm 977, contacts 978, voice dial 979, email 980, calendar 981, media player 982, album 983, or clock 984, health care (for example, measurement of an exercise amount or a glucose level), or providing of environment information (for example, information about atmospheric pressure, humidity, or temperature).

According to an embodiment of the present disclosure, the applications 970 may include an application (for the convenience of description, referred to as 'information exchange application') supporting information exchange between the electronic device (for example, the electronic device 701) and an external electronic device (the electronic device 702 or 704). The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device (for example, the electronic device 702 or 704). Also, the notification relay application may, for example, receive notification information from the external electronic device and transmit the received notification information to a user.

The device management application may, for example, manage (for example, install, delete, or update) at least a part of functions of the external electronic device (for example, the electronic device 702 or 704) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment of the present disclosure, the applications 970 may include an application (for example, a health care application) designated according to a property (for example, the type of the electronic device as a property of the electronic device is a mobile medical device) of the external electronic device (for example, the electronic device 702 or 704). According to an embodiment of the present disclosure, the applications 970 may include an application received from an external electronic device (for example, the server 706 or the electronic device 702 or 704). According to an embodiment of the present disclosure, the applications 970 may include a preloaded application or a third party application downloadable from a server. The names of components of the programming module 910 according to embodiment of the present disclosure may vary according to the type of an OS.

According to various embodiments, at least a part of the programming module 910 may be implemented in software, firmware, hardware, or a combination of at least two of them. At least a part of the programming module 910 may be implemented (for example, executed) by the processor (for example, the processor 810). At least a part of the programming module 910 may include, for example, a module, a program, a routine, a set of instructions, or a process to execute one or more functions.

Figure 10:
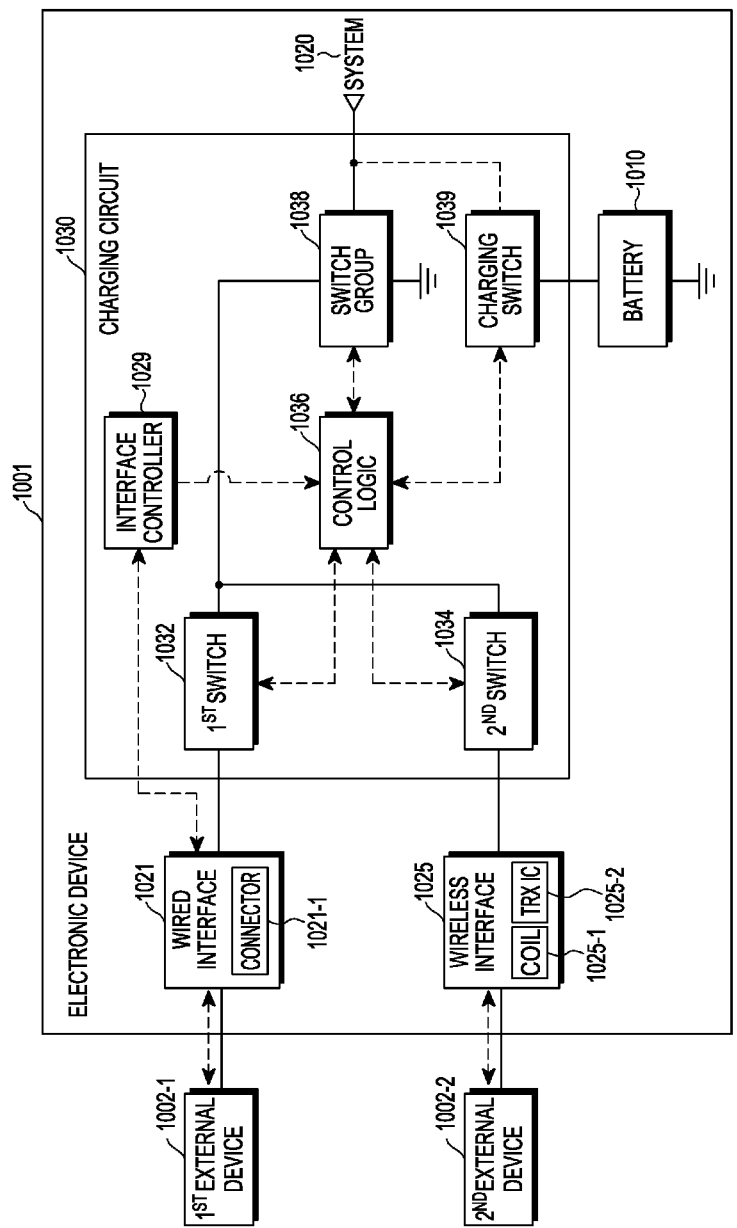
FIG. 10 is a block diagram of a charging circuit according to various embodiments of the present disclosure.

FIG. 10 is a block diagram of a charging circuit according to various embodiments of the present disclosure.

Referring to FIG. 10, an electronic device 1001 according to various embodiments may include at least one of a battery 1010, a wired interface 1021, a wireless interface 1025, and a charging circuit 1030.

The battery 1010 may be mounted in a housing of the electronic device 1001 and chargeable. The battery 1010 may include, for example, a rechargeable battery and/or a solar battery.

Each of the wired interface 1021 and the wireless interface 1025 may be installed in a part of the housing of the electronic device 1001 and connectable to an external device. The wired interface 1021 may include a connector 1021-1 such as a USB and may be connected to a first external device 1002-1 through the connector 1021-1. The wireless interface 1025 may include a coil 1025-1 (referred to as a 'conductive pattern') and a transmit/receive integrated chip (TRX IC) 1025-2, and may wirelessly transmit and receive power to and from a second external device 1002-2 through the conductive pattern 1025-1 and the TRX IC 1025-2. Wireless power may be transmitted and received in a magnetic inductive coupling scheme, a resonance coupling scheme, or a hybrid scheme of both. According to an embodiment of the present disclosure, the conductive pattern 1025-1 may include a first conductive pattern for transmitting wireless power and a second conductive pattern for receiving wireless power.

The first external device 1002-1 is an external device connectable wiredly. The first external device 1002-1 may be a wired power supply device, a wired power reception device, or an on the go (OTG) device. The OTG device may be a device that is connected to the electronic device 1001 and executes an OTG function of data transmission and reception to and from the electronic device 1001, such as a PDA, an MP3 player, a portable phone, a mouse, a keyboard, a USB memory, and a health care accessory. The wired power supply device may be a device that is connected wiredly to the electronic device 1001 and supplies power to the electronic device 1001, such as a travel adapter (TA). The wired power reception device may be connected wiredly to the electronic device 1001 and receive power from the electronic device 1001. Also, the wired power reception device may be a device capable of charging another battery provided in it.

According to an embodiment of the present disclosure, the first external device 1002-1 connected to the electronic device 1001 through the wired interface 1021 may include a wired high voltage (HV) device (for example, a device supporting adaptive fast charge (AFC)). If the wired HV device is connected to the connector 1021-1, a higher voltage (for example, 9V) than a voltage (for example, 5V) supplied to the battery 1010 may be supplied to the wired HV device.

The second external device 1002-2 may include a wireless power supply device or a wireless power reception device. According to various embodiments, the wireless power supply device may be a device that supplies wireless power to the electronic device 1001 using the first conductive pattern, like a wireless charging pad. The wireless power reception device may be a device that is capable of receiving wireless power from the electronic device 1001 using the second conductive pattern and charges another battery included in the wireless power reception device with the received power.

According to an embodiment of the present disclosure, the second external device 1002-2 connected to the electronic device 1001 through the wireless interface 1025 may include a wireless HV device (for example, a device supporting AFC). According to an embodiment of the present disclosure, the wireless HV device may include a wireless charging pad supporting fast charging. The wireless charging pad may determine whether to perform fast charging by communicating with the TRX IC 1025-2 through in-band communication or through a separate communication module (for example, conforming to BT, ZigBee, or the like). For example, the electronic device 1001 may request 9V HV charging to the wireless charging pad through the TRX IC 1025-2, and the wireless charging pad may determine whether fast charging is possible through communication with the electronic device 1001 according to the HV charging request of the electronic device 1001. If determining that fast charging is possible, the wireless charging pad may supply 9V power to the electronic device 1001.

The charging circuit 1030 may be electrically connected to the battery 1010, and may be configured to make an electrical connection between the battery 1010 and the wired interface 1021 and between the battery 120 and the wireless interface 1025. The charging circuit 1030 may be configured to wirelessly transmit power to the second external device 1002-2 (for example, a wireless power reception device) by electrically connecting the battery 1010 to a conductive pattern (for example, the first conductive pattern), and wiredly transmit power to the first external device 1002-1 (for example, a wired power reception device) by electrically connecting the battery 1010 to the connector 1021-1, simultaneously with wireless power transmission to the outside. For example, the charging circuit 1030 may convert first power generated from the battery 1010 to second power higher than the first power and transmit at least part of the second power as third power to the wireless power reception device through the first conductive pattern, and transmit at least another part of the second power as fourth power to an OTG device or a wired power reception device through the connector 1021-1. Also, the charging circuit 1030 may transmit another part of the second power as the fourth power to the OTG device or the wired power reception device through the connector 1021-1, simultaneously with transmission of part of the second power as the third power to the external wireless power reception device through the first conductive pattern.

According to an embodiment of the present disclosure, the charging circuit 1030 may perform all operations of the power management circuit 110 illustrated in FIG. 1 and may be configured to include the power management circuit 110.

According to an embodiment of the present disclosure, the charging circuit 1030 may include at least one of an interface controller 1029, a first switch 1032, a second switch 1034, a control logic 1036, a switch group 1038, and a charging switch 1039.

The interface controller 1029 may determine the type of the first external device 1002-1 connected to the wired interface 1021 and determine whether the first external device 1002-1 supports fast charging by AFC communication with the first external device 1002-1. According to an embodiment of the present disclosure, the interface controller 1029 may include a micro USB interface IC (MUIC) or an AFC interface. For example, the MUIC may determine whether the first external device 1002-1 connected to the wired interface 1021 is a wired power supply device, a wired power reception device, or an OTG device. For example, the AFC interface may determine whether the first external device 1002-1 supports fast charging through AFC communication with the first external device 1002-1. If fast charging is supported, the first external device 1002-1 may increase transmission/reception power. For example, in the case where the first external device 1002-1 is a wired power supply device that generally transmits power of 10 W (10 W=5V*2 A), if fast charging is supported, power of 18 W (18 W=9V*2 A) may be transmitted.

The first switch 1032 may include one or more switches. The first switch 1032 may control power output to a device connected through the wired interface 1021, for example, the connector 1021-1, for example, an OTG device or a wired power reception device and power input from a wired power supply device. For example, the first switch 1032 may be switched on to output power to, for example, an OTG device or a wired power reception device and receive power from a wired power supply device. Or the first switch 1032 may be switched off neither to output power to, for example, an OTG device or a wired power reception device and nor to receive power from a wired power supply device.

The second switch 1034 may include one or more switches. The second switch 1034 may control power input from a wireless power supply device and power output to a wireless power reception device through the wireless interface 1025, for example, the conductive pattern 1025-1, and the TRX IC 1025-2. For example, the second switch 1034 may be switched on to enable power input from the wireless power supply device and power output to the wireless power reception device, or switched off to disable power input from the wireless power supply device and power output to the wireless power reception device.

The control logic 1036 may control conversion of power received from at least one of the first switch 1032 and the second switch 1034 to a charging voltage and a charging current suitable for charging the battery 1010, conversion of power received from the battery 1010 to a charging voltage and a charging current suitable for charging a battery of an external device connected to each of the first switch 1032 and the second switch 1034, and conversion of power received from the battery 1010 to a voltage and a current suitable for use in an external device.

The control logic 1036 may execute at least one of a charging current sensing function, a charging cutoff function, a CC loop function, a CV loop function, a terminal current loop function, a recharging loop function, and a—— (bat to sys FET) loop function. The charging current sensing function may be a function for detecting the amount of a charging current. The charging cutoff function may be a function for terminating charging of the battery 1010 upon overcharging or overheating. The CC loop function may be a function for controlling a CC interval during which a charging current is maintained constant. The CV loop function may be a function for controlling a CV interval during which a charging voltage is maintained constant. The termination current loop function may be a function for controlling charging termination. The recharging loop function may be a function for controlling recharging. The bat to sys FET loop function may be a function for controlling a voltage and a current between systems.

According to an embodiment of the present disclosure, the control logic 1036 may control the charging circuit 1030 to transmit power of the battery 1010 to the outside selectively wirelessly or wiredly. Also, the control logic 1036 may control transmission of power to the first external device 1002-1 and/or the second external device 1002-2 through the charging circuit 1030 or reception of power from the first external device 1002-1 and/or the second external device 1002-2 through the charging circuit 1030.

According to an embodiment of the present disclosure, if a wired power supply device is connected, the control logic 1036 may control charging of the battery 1010 with power received from the wired power supply device. If an OTG device is connected, the control logic 1036 may control execution of the OTG function. If a wireless power supply device is connected, the control logic 1036 may control charging of the battery 1010 with power received from the wireless power supply device. If a wireless power supply device and an OTG device are connected, the control logic 1036 may control execution of the OTG function simultaneously with charging the battery 1010 by receiving power from the wireless power supply device. If a wired power reception device is connected, the control logic 1036 may control supply of power of the battery 1010 to the wired power reception device. If a wireless power reception device is connected, the control logic 1036 may control supply of power of the battery 1010 to the wireless power reception device. If a wired power supply device and a wireless power reception device are connected, the control logic 1036 may control supply of power of the battery 1010 to the wireless power reception device, simultaneously with charging the battery 1010 by receiving power from the wired power supply device. If an OTG device and a wireless power reception device are connected, the control logic 1036 may control supply of power of the battery 1010 to the wireless power reception device, simultaneously with execution of the OTG function.

The switch group 1038 may boost or buck the voltage of the battery 1010 in order to supply a CC to a system 1020 (for example, a system that supplies power to each module of the electronic device 1001) or a connected external device, or boost or buck a charging voltage received to supply a CC to the battery 1010. According to an embodiment of the present disclosure, the switch group 1038 may include a buck/boost converter.

The charging switch 1039 may detect the amount of a charging current and terminate charging of the battery 1010 upon overcharging or overheating.

According to an embodiment of the present disclosure, the electronic device 1001 may include a display (for example, the display 760). The display may display a user interface configured to control at least part of the charging circuit 1030. The display may receive a user input for wirelessly or wiredly transmitting power from the battery 1010 to an external device. The display may indicate at least one external device connected to the electronic device 1001, the remaining power of the connected external device, or whether power is being supplied to or received from the connected external device. If a plurality of external devices are connected and power is being supplied to each of the external devices, the display may display a screen on which power distribution to the external devices may be controlled. Also, the display may display a screen for displaying display information about a connected external device. At least part of content displayed on the display may be changed according to a signal received from the connected external device.

In a storage medium storing commands according to an embodiment of the present disclosure, the commands are configured to, when at least one processor executes the commands, control the at least one processor to perform at least one operation. The at least one operation may include supplying power from an external power source to a battery to apply a substantially CC to the battery during a first time interval, supplying power from the external power source to the battery to maintain a substantially CV in the battery during a second time interval, sensing a current value applied to the battery and a voltage value of the battery, and determining a duration of the first time interval based on at least part of the sensed current value and voltage value.

As is apparent from the forgoing description, a method and an electronic device for supplying power to a battery, which efficiently charge a battery by reducing a charging time of the battery can be provided according to various embodiments of the present disclosure.

The term "module" as used herein may include its ordinary meaning including, for example, a unit of one, or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific IC (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor (for example, the processor 720), one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc ROM (CD-ROM)), DVD, magneto-optical media (for example, floptical disk), hardware devices (for example, ROM, RAM or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added. The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Accordingly, an aspect of the present disclosure is to provide a method and electronic device for reducing the charging time of a battery.

What is claimed is:

1. An electronic device comprising:
a housing;
a battery disposed inside the housing; and
a power management circuit configured to control power supplied from an external power source to the battery,
wherein the power management circuit is configured to:
supply power from the external power source to the battery to apply a substantially constant current to the battery during a first time interval, and
supply power from the external power source to the battery to maintain a substantially constant voltage in the battery during a second time interval following the first time interval,
wherein, during the first time interval, the power management circuit is further configured to:
sense a current value applied to the battery and a voltage value of the battery,
determine an internal resistance value of the battery based on the at least part of the sensed current value and the sensed voltage value, and
determine a duration of the first time interval based on at least part of the internal resistance value of the battery.

2. The electronic device of claim 1, wherein the power management circuit comprises a sensor module configured to sense the current value applied to the battery or the voltage value of the battery.

3. The electronic device of claim 1, wherein the power management circuit is further configured to:
determine an internal resistance value of the battery based on the at least part of the sensed current value and the sensed voltage value, and
change the duration of the first time interval based on at least part of the internal resistance value.

4. The electronic device of claim 1, wherein, during the first time interval, the power management circuit is further configured to:
determine an alternating current (AC) current value or an AC voltage value applied to an internal resistor of the battery based on at least part of a ratio between a variation in the sensed current value and a variation in the sensed voltage value, and
determine the internal resistance value of the battery based on at least part of the AC current value or the AC voltage value.

5. The electronic device of claim 4, wherein the power management circuit is further configured to determine a first reference value to which the voltage value of the battery is to reach during the first time interval based on the at least part of the internal resistance value of the battery.

6. The electronic device of claim 5, wherein the power management circuit is further configured to control power supply to the battery to apply a constant current to the battery until the voltage value of the battery reaches the first reference value during the first time interval.

7. The electronic device of claim 5, wherein the power management circuit is further configured to:
maintain, as the first reference value, a value calculated by subtracting a voltage value applied to the internal resistor of the battery from the voltage value of the battery during the second time interval, and
if a current value applied to the battery is equal to or smaller than a predetermined second reference value, terminate the second time interval.

8. The electronic device of claim 7, wherein, if the voltage value of the battery reaches the first reference value during the first time interval, the power management circuit is further configured to:
check a current value applied to the battery, and
control power supply to the battery to make the checked current value equal to the predetermined second reference value.

9. The electronic device of claim 1, wherein, if the voltage value of the battery reaches a maximum voltage value applicable to the battery, the power management circuit is further configured to terminate both of the first time interval and the second time interval.

10. A method for operating an electronic device that is connected electrically to each of a battery and an external power source and supplying power to the battery, the method comprising:
    supplying power from an external power source to the battery apply a substantially constant current to the battery during a first time interval; and
    supplying power from the external power source to the battery to maintain a substantially constant voltage in the battery during a second time interval,
    wherein the supplying of the power during the first time interval comprises:
        sensing a current value applied to the battery and a voltage value of the battery,
        determining an internal resistance value of the battery based on the at least part of the sensed current value and the sensed voltage value, and
        determining a duration of the first time interval based on at least part of the internal resistance value of the battery.

11. The method of claim 10, wherein determining the duration of the first time interval comprises:
    changing the duration of the first time interval based on at least part of the internal resistance value.

12. The method of claim 10, wherein the determining of the internal resistance value of the battery comprises:
    determining an alternating current (AC) voltage value applied to the battery based on at least part of a ratio between a variation in the sensed current value and a variation in the sensed voltage value during the first time interval; and
    determining the internal resistance value of the battery based on at least part of the AC voltage value.

13. The method of claim 12, further comprising determining a first reference value to which the voltage value of the battery is to reach during the first time interval based on the at least part of the internal resistance value of the battery.

14. The method of claim 13, wherein the determining of the duration of the first time interval comprises controlling power supply to the battery to apply a constant current to the battery until the voltage value of the battery reaches the first reference value during the first time interval.

15. The method of claim 13, further comprising:
    controlling power supply to the battery to maintain, as the first reference value, a value calculated by subtracting a voltage value applied to the internal resistor of the battery from the voltage value of the battery during the second time interval; and
    if a current value applied to the battery is equal to or smaller than a predetermined second reference value, terminating the second time interval.

16. The method of claim 15, further comprising:
    if the voltage value of the battery reaches the first reference value during the first time interval, checking a current value applied to the battery; and
    controlling power supply to the battery to make the checked current value equal to the predetermined second reference value.

17. The method of claim 11, further comprising:
    if the voltage value of the battery reaches the first reference value during the first time interval, checking a current value applied to the battery; and
    controlling power supply to the battery to make the checked current value equal to the predetermined second reference value.

18. The method of claim 10, further comprising, if the voltage value of the battery reaches a maximum voltage value applicable to the battery, terminating the first time interval and the second time interval.

19. A non-transitory storage medium storing commands for, when the commands are executed by at least one processor, controlling the at least one processor to perform a method, the method comprising:
    supplying power from an external power source to a battery apply a substantially constant current to the battery during a first time interval; and
    supplying power from the external power source to the battery to maintain a substantially constant voltage in the battery during a second time interval,
    wherein the supplying of the power during the first time interval comprises:
        sensing a current value applied to the battery and a voltage value of the battery,
        determining an internal resistance value of the battery based on the at least part of the sensed current value and the sensed voltage value, and
        determining a duration of the first time interval based on at least part of the internal resistance value of the battery.

* * * * *